US011157226B2

(12) United States Patent
Yamada et al.

(10) Patent No.: US 11,157,226 B2
(45) Date of Patent: Oct. 26, 2021

(54) CONTROL APPARATUS, HEAD MOUNTED DISPLAY AND ROBOT SYSTEM

(71) Applicant: Seiko Epson Corporation, Tokyo (JP)

(72) Inventors: Yoshihito Yamada, Chino (JP); Hiroki Adachi, Matsumoto (JP)

(73) Assignee: Seiko Epson Corporation

( * ) Notice: Subject to any disclaimer, the term of this patent is extended or adjusted under 35 U.S.C. 154(b) by 2 days.

(21) Appl. No.: 16/516,319

(22) Filed: Jul. 19, 2019

(65) Prior Publication Data

US 2020/0026478 A1 Jan. 23, 2020

(30) Foreign Application Priority Data

Jul. 20, 2018 (JP) .............................. JP2018-136769

(51) Int. Cl.
*G06F 3/14* (2006.01)
*G06F 3/01* (2006.01)
*G02B 27/01* (2006.01)
*B25J 13/06* (2006.01)
*B25J 13/00* (2006.01)

(52) U.S. Cl.
CPC ................ *G06F 3/14* (2013.01); *B25J 13/06* (2013.01); *G02B 27/0172* (2013.01); *G06F 3/011* (2013.01); *B25J 13/006* (2013.01); *G02B 2027/0141* (2013.01); *G05B 2219/39427* (2013.01); *G05B 2219/50391* (2013.01)

(58) Field of Classification Search
None
See application file for complete search history.

(56) References Cited

U.S. PATENT DOCUMENTS

| 9,855,664 | B2 | 1/2018 | Yamamoto et al. | |
|---|---|---|---|---|
| 2016/0207198 | A1* | 7/2016 | Willfor | B25J 9/1676 |
| 2017/0210017 | A1* | 7/2017 | Yamamoto | B25J 13/088 |
| 2017/0274532 | A1 | 9/2017 | Nishitani et al. | |
| 2018/0243920 | A1* | 8/2018 | Hashimoto | B25J 3/00 |

FOREIGN PATENT DOCUMENTS

| JP | 2017-100205 A | 6/2017 |
|---|---|---|
| JP | 2017-177283 A | 10/2017 |

* cited by examiner

*Primary Examiner* — Jennifer Mehmood
*Assistant Examiner* — Jed-Justin Imperial
(74) *Attorney, Agent, or Firm* — Harness, Dickey & Pierce, P.L.C.

(57) ABSTRACT

A control apparatus that controls a robot having a movable unit, includes a display control unit that changes a display form of a virtual wall displayed on a display unit transmitting visible light based on a distance between the virtual wall on a real space and the movable unit and a velocity of the movable unit.

20 Claims, 17 Drawing Sheets

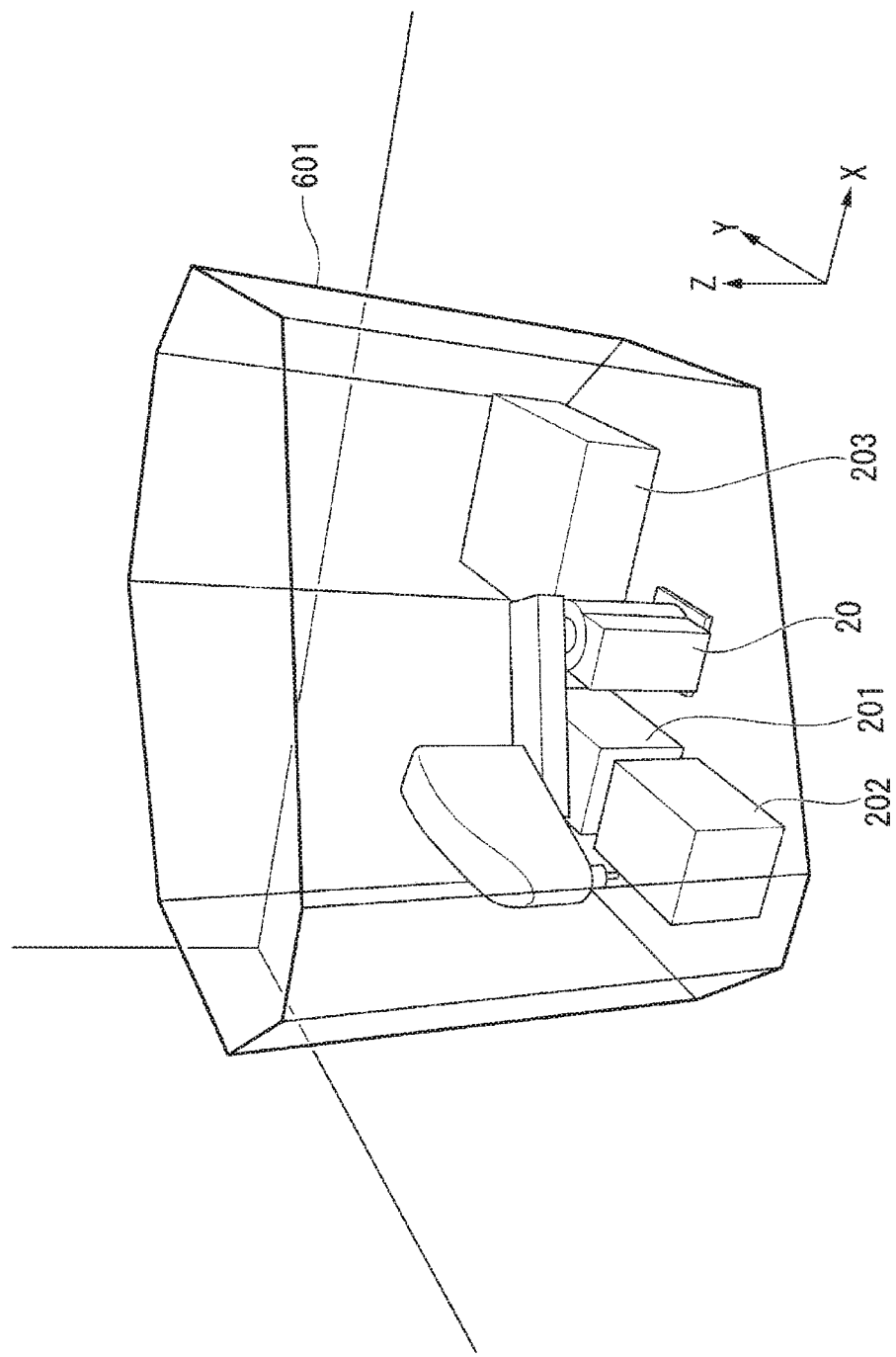

CONTROL APPARATUS, HEAD MOUNTED DISPLAY AND ROBOT SYSTEM

The present application is based on, and claims priority from, JP Application Serial Number 2018-136769, filed Jul. 20, 2018, the disclosure of which is hereby incorporated by reference herein in its entirety.

BACKGROUND

1. Technical Field

The present disclosure relates to a control apparatus, head mounted display, and robot system.

2. Related Art

A virtual wall is displayed for a human who performs work near a robot (hereinafter, for convenience of explanation, also referred to as "worker").

As an example, in a virtual fence display system disclosed in JP-A-2017-100205, a robot safety controller holds 3D model image data of a virtual fence (virtual safety fence), with a position of a robot arm at the center, virtually placed around the position, and enables display of the image data in a divisional form of a plurality of rectangular parallelepipeds with images of the respective rectangular parallelepipeds at predetermined transmission factors. In the virtual fence display system, the robot safety controller acquires information of the position and the direction of the worker wearing smart glasses, and then, processes the 3D model image data of the virtual fence to be displayed on a display unit according to the position and direction relationship between the virtual fence and the worker so that, of the plurality of rectangular parallelepipeds, the rectangular parallelepipeds at the sides closer to the worker have lower transmission factors and the rectangular parallelepipeds at the sides farther from the worker have higher lower transmission factors and transmits the data to the smart glasses side. Then, the smart glasses project and display the received 3D model image data on the display unit (see JP-A-2017-100205, particularly see Abstract).

Note that the virtual fence corresponds to the virtual wall.

However, in the virtual fence display system disclosed in JP-A-2017-100205, transmittance of the virtual fence closest to the worker is lower, and, as the worker moves closer to the robot, the worker may be harder to grasp the actual state of the robot. The state of the robot includes e.g. a state in which the robot stops and a state in which the robot is in operation at a higher speed or lower speed.

As specific examples, when the worker performs direct teaching using force control (force sense control) or when the worker temporarily stops the robot, moves closer to the robot, and performs work, it may be difficult for the worker to view the display unit of the smart glasses and observe the state of the robot. Further, for example, when the worker checks the state of the robot without using the smart glasses, it may be impossible for the worker to check the setting status of the virtual fence.

JP-A-2017-100205 is an example of the related art.

As described above, in the virtual fence display system according to the related art, the transmittance of the virtual fence displayed on the display unit of the smart glasses is controlled based on the position and direction relationship between the virtual fence and the worker, however, it may be difficult for the worker to grasp the current status of the robot.

SUMMARY

An aspect of the present disclosure is directed to a control apparatus that controls a robot having a movable unit, including a display control unit that changes a display form of a virtual wall displayed on a display unit transmitting visible light based on a distance between the virtual wall on a real space and the movable unit and a velocity of the movable unit.

Another aspect of the present disclosure is directed to a head mounted display including a display unit that displays a virtual wall and transmits visible light, and a display control unit that changes a display form of the virtual wall displayed on the display unit based on a distance between a movable unit of a robot and the virtual wall on a real space and a velocity of the movable unit.

Another aspect of the present disclosure is directed to a robot system including a robot having a movable unit, a head mounted display having a display unit that transmits visible light and displaying a virtual wall on the display unit, and a display control unit that changes a display form of the virtual wall displayed on the display unit based on a distance between the virtual wall on a real space and the movable unit and a velocity of the movable unit.

BRIEF DESCRIPTION OF THE DRAWINGS

FIG. 22 shows an example of the virtual wall according to the one embodiment of the present disclosure.

DESCRIPTION OF EXEMPLARY EMBODIMENTS

Figure 1:
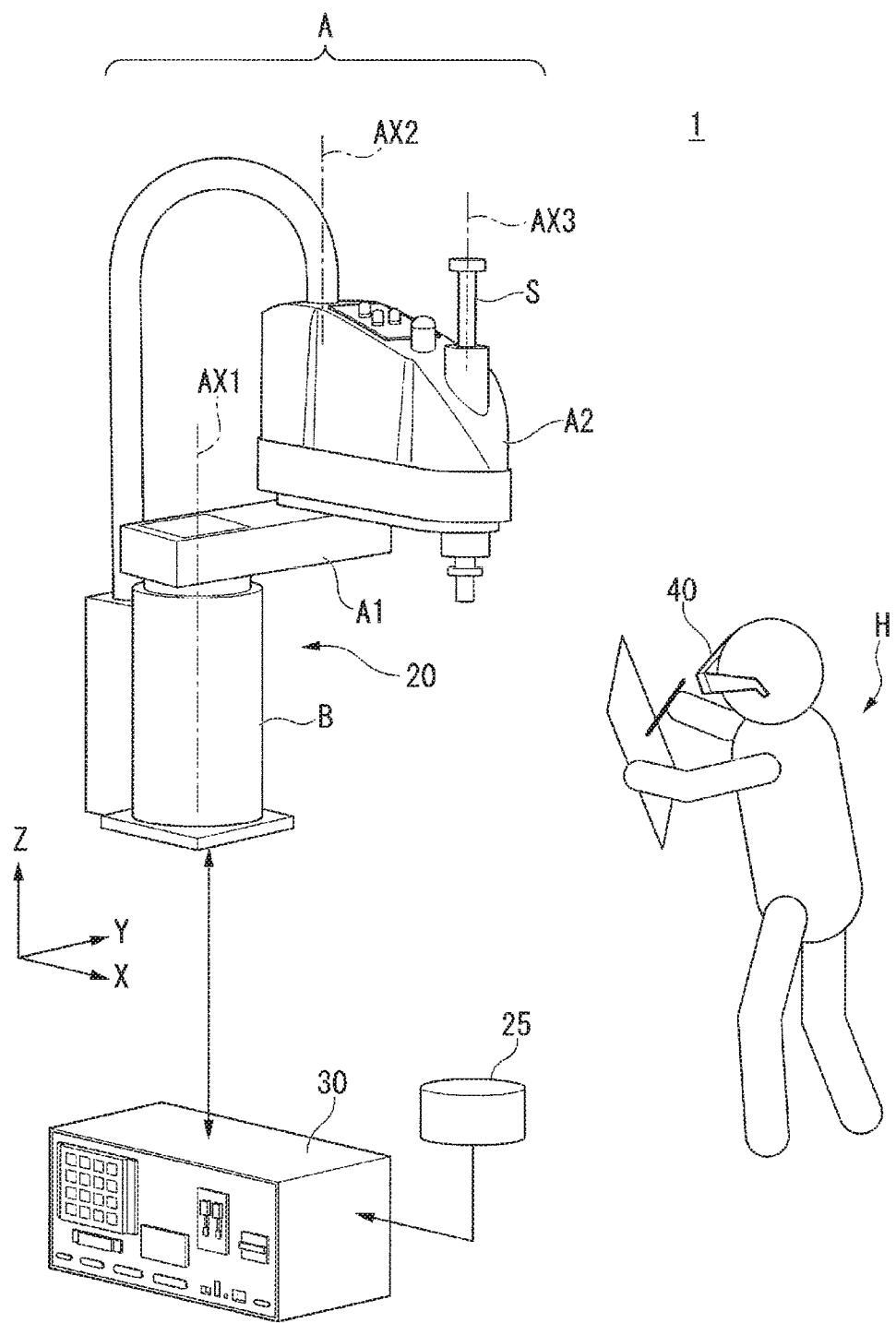
FIG. 1 shows a schematic configuration example of a robot system according to one embodiment of the present disclosure.

FIG. 1 shows the schematic configuration example of the robot system 1 according to the one embodiment of the present disclosure.

For convenience of explanation, FIG. 1 shows axes of an XYZ orthogonal coordinate system.

The robot system 1 includes a robot 20, a position detection apparatus 25, a robot control apparatus 30, and a display apparatus 40.

Here, in the embodiment, the robot 20 is a horizontal articulated robot (scalar robot). Further, the robot 20 may be e.g. an industrial robot or a robot for other use.

FIG. 1 shows a worker H wearing the display apparatus 40. The worker H may be a human who operates the robot control apparatus 30 or a human who performs work relating to the robot 20.

The robot 20 is installed on a floor surface. Note that the robot 20 may be installed on another surface e.g. a wall surface, ceiling surface, top surface of a table, surface of a jig, surface of a bench in place of the floor surface.

In the embodiment, for convenience of explanation, a direction orthogonal to the surface on which the robot 20 is installed and toward the surface from the robot 20 is referred to as "lower" or "downward direction" and a direction opposite to that direction is referred to as "upper" or "upward direction". In the embodiment, as an example, the case where the downward direction coincides with the gravity direction and coincides with a negative direction along a Z-axis in a robot coordinate system RC of the robot 20 will be explained.

Note that, as another example, the downward direction may not coincide with one or both the gravity direction and the negative direction.

The robot 20 includes a movable unit A and a base B supporting the movable unit A.

The movable unit A includes a first arm A1 pivotably supported about a first pivot axis AX1 by the base B, a second arm A2 pivotably supported about a second pivot axis AX2 by the first arm A1, and a shaft S supported pivotably about a third pivot axis AX3 and translationally in an axial direction of the third pivot axis AX3 by the second arm A2.

The shaft S is a circular columnar shaft member. A ball screw groove (not shown) and a spline groove (not shown) are formed in the circumferential surface of the shaft S. In the embodiment, the shaft S is provided to penetrate an end portion of end portions of the second arm A2 opposite to the first arm A1 in the upward and downward directions.

An external device such as an end effector can be attached to the lower end portion of end portions of the shaft S. In the example of FIG. 1, nothing is attached to the end portion. The end effector attached to the end portion may be an arbitrary end effector, e.g. an end effector capable of holding an object with finger parts, an end effector capable of holding an object by suction using air, magnetic force, or the like, or another end effector capable of holding an object. Or, the end effector attached to the end portion may be e.g. an end effector incapable of holding an object. Note that, in the embodiment, to hold an object is to enable lifting of the object.

The first arm A1 pivots about the first pivot axis AX1 and moves in horizontal directions. The horizontal directions are orthogonal to the upward and downward directions. In the embodiment, the horizontal directions are directions along the XY plane as a plane formed by the X-axis and the Y-axis in the robot coordinate system RC. Note that the directions in which the first arm A1 moves may be directions not orthogonal to the upward and downward directions in place of the directions orthogonal to the upward and downward directions (horizontal directions).

Further, the first arm A1 is pivoted (driven) about the first pivot axis AX1 by a first motor (not shown) provided in the base B.

As an example, the first pivot axis AX1 is a hypothetical axis aligned with a pivot axis of the first motor, however, as another example, the axis may be a hypothetical axis not aligned with the pivot axis of the first motor.

The second arm A2 pivots about the second pivot axis AX2 and moves in the horizontal directions. The second arm A2 is pivoted (driven) about the second pivot axis AX2 by a second motor (not shown) provided in the second arm A2. Note that the directions in which the second arm A2 moves may be directions not orthogonal to the upward and downward directions in place of the directions orthogonal to the upward and downward directions (horizontal directions).

As an example, the second pivot axis AX2 is a hypothetical axis aligned with a pivot axis of the second motor, however, as another example, the axis may be a hypothetical axis not aligned with the pivot axis of the second motor.

Further, the second arm A2 includes a third motor (not shown) and a fourth motor (not shown) and supports the shaft S. The third motor pivots a ball screw nut provided in an outer circumferential portion of the ball screw groove of the shaft S with a timing belt or the like, and thereby, moves the shaft S in the upward and downward directions (up and down). The fourth motor pivots a ball spline nut provided in an outer circumferential portion of the spline groove of the shaft S with a timing belt or the like, and thereby, pivots (drives) the shaft S about the third pivot axis AX3.

As an example, the third pivot axis AX3 is a hypothetical axis aligned with a center axis of the shaft S, however, as another example, the axis may be a hypothetical axis not aligned with the center axis of the shaft S.

The robot 20 is communicably connected to the robot control apparatus 30 by wireless or wired connection.

The position detection apparatus 25 is communicably connected to the robot control apparatus 30 by wireless or wired connection.

The display apparatus 40 is communicably connected to the robot control apparatus 30 by wireless or wired connection.

The position detection apparatus 25 detects a position of the worker H existing around the robot 20. In the embodiment, the worker H performs some work around the robot 20. In the embodiment, the worker H wears the display apparatus 40 and performs work around the robot 20. The location around the robot 20 refers to e.g. inside of a room in which the robot 20 is installed, however, is not limited to that. The location may be within a spherical region having a predetermined radius with the robot 20 at the center, within a region in which the robot 20 can perform work, or within another region according to the robot 20.

The position detection apparatus 25 is e.g. an area sensor. For example, the area sensor is set in a vicinity of the robot 20, and thereby, may detect an object approaching the robot 20 or detect the position of the object in a range in which the object can be detected.

The position detection apparatus 25 detects the position of the worker H around the robot 20 and transmits information representing the detected position (for convenience of explanation, also referred to as "worker position information") to the robot control apparatus 30.

Here, in the embodiment, the position detection apparatus 25 detects the position of the display apparatus as the position of the worker H. That is, in the embodiment, the position of the display apparatus 40 is regarded as the position of the worker H. Note that, as another example, the position detection apparatus 25 may be adapted to detect the position of the worker H itself.

Note that an arbitrary method may be used as the method of detecting the position of the worker H or display apparatus 40.

For example, a method using a laser range sensor detecting shape data of an object using laser to detect the position of the object may be used.

Or, for example, a method with a receiver of GPS (Global Positioning System) provided in the worker H or display apparatus 40 to detect the position of the worker H or display apparatus 40 using the function of GPS may be used. In this case, for example, the receiver transmits information of the position of the worker H or display apparatus 40 acquired by the function of GPS to the position detection apparatus 25, and the position detection apparatus 25 acquires the information.

The robot control apparatus 30 allows the robot to perform predetermined work by control based on an operation program stored in advance.

The robot control apparatus 30 receives and acquires the worker position information transmitted from the position detection apparatus 25.

The robot control apparatus 30 transmits information of an image to be displayed or other information to the display apparatus 40.

The display apparatus 40 is e.g. a head mounted display (HMD). That is, the display apparatus 40 has a display unit (e.g. display) that transmits visible light and can display an image in a part or all of the display unit.

The display apparatus 40 is attached to the worker H according to a predetermined attachment method. When the worker H wears the display apparatus 40 according to the attachment method, the display unit of the display apparatus 40 is placed to cover at least a part of the field of view of the worker H. Further, the display unit transmits the visible light, and thereby, the worker H may view the outside world through the display unit. Here, the outside world refers to a field of view at the opposite side to the side of the worker H with respect to the display unit of the display apparatus 40.

For example, the display apparatus 40 receives the information of the image transmitted from the robot control apparatus 30 and displays the image based on the received information of the image on the display unit.

Further, for example, the display apparatus 40 may receive other information than the image information transmitted from the robot control apparatus 30, generate an image based on the received information, and display the generated image on the display unit.

Hardware Configuration of Robot Control Apparatus

Figure 2:
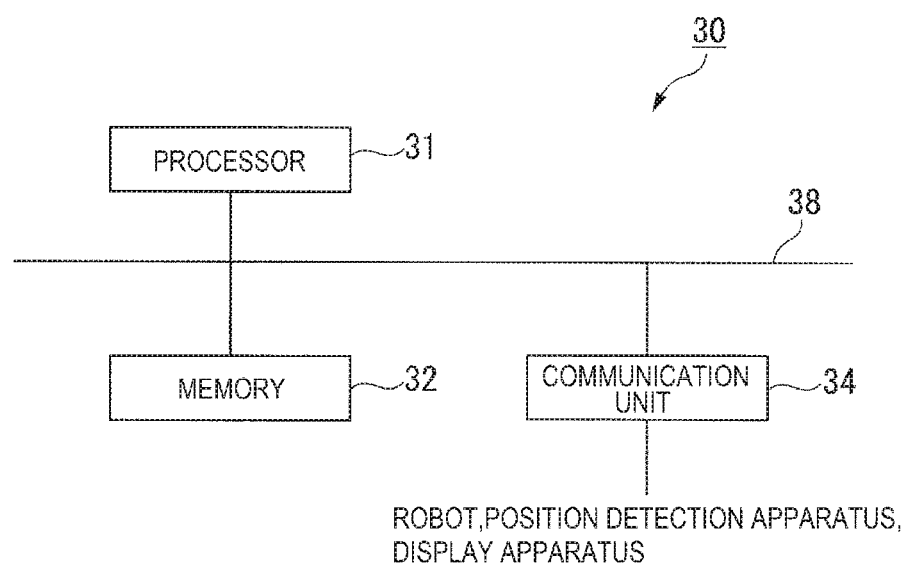
FIG. 2 shows an example of a hardware configuration of a robot control apparatus according to the one embodiment of the present disclosure.

FIG. 2 shows the example of the hardware configuration of the robot control apparatus 30 according to the one embodiment of the present disclosure.

The robot control apparatus 30 includes e.g. a processor 31, a memory (for convenience of explanation, referred to as "control apparatus-side memory 32"), a communication unit (for convenience of explanation, referred to as "control apparatus-side communication unit 34"). These component elements are communicably connected to one another via a bus 38. Further, the robot control apparatus 30 communicates with the respective robot 20, position detection apparatus 25, and display apparatus 40 via the control apparatus-side communication unit 34.

The processor 31 is e.g. a CPU (Central Processing Unit). Note that the processor 31 may be another processor such as an FPGA (Field Programmable Gate Array). The processor 31 reads and executes various programs stored in the control apparatus-side memory 32.

The control apparatus-side memory 32 may include one or more of e.g. an HDD (Hard Disk Drive), SSD (Solid State Drive), EEPROM (Electrically Erasable Programmable Read Only Memory), ROM (Read Only Memory), and RAM (Random Access Memory). Note that the control apparatus-side memory 32 may be an external storage device connected via a digital input-output port such as a USB (Universal Serial Bus) in place of the storage device provided in the robot control apparatus 30. The control apparatus-side memory 32 stores various kinds of information, various images, various operation programs to be processed by the robot control apparatus 30.

The control apparatus-side communication unit 34 is an interface for communication with an external device.

The control apparatus-side communication unit 34 includes one or more of e.g. a digital input-output port such as a USB and a port of Ethernet (registered trademark).

Note that the robot control apparatus 30 may include an input device such as e.g. a keyboard, a mouse, a touch pad. Further, the robot control apparatus 30 may include a display device having e.g. a liquid crystal display panel or organic EL (ElectroLuminescence) display panel.

Functional Configurations of Robot Control Apparatus and Display Apparatus

Figure 3:
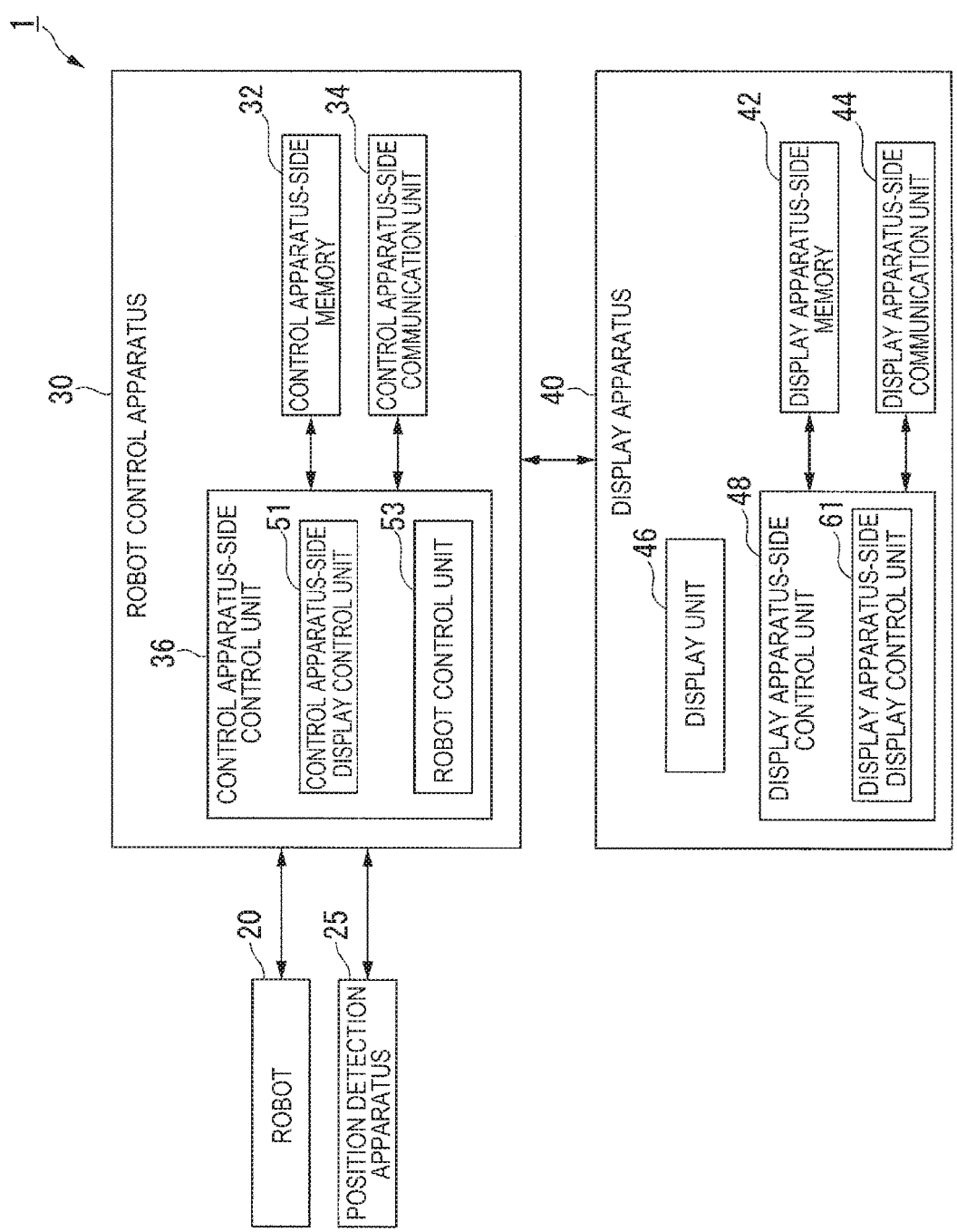
FIG. 3 shows an example of a functional configuration of the robot control apparatus and an example of a functional configuration of a display apparatus according to the one embodiment of the present disclosure.

FIG. 3 shows the example of the functional configuration of the robot control apparatus 30 and the example of the functional configuration of the display apparatus 40 according to the one embodiment of the present disclosure.

Functional Configuration of Robot Control Apparatus

The robot control apparatus 30 includes the control apparatus-side memory 32, the control apparatus-side communication unit 34, and a control unit (for convenience of explanation, referred to as "control apparatus-side control unit 36").

The control apparatus-side control unit 36 controls the entire of the robot control apparatus 30. The control apparatus-side control unit 36 includes a display control unit (for convenience of explanation, referred to as "control apparatus-side display control unit 51"), and a robot control unit 53. These functional units provided in the control apparatus-side control unit 36 are realized by e.g. the processor 31 executing various programs stored in the control apparatus-side memory 32. Further, part or all of these functional units may be a hardware functional unit such as an LSI (Large Scale Integration) or ASIC (Application Specific Integrated Circuit).

The control apparatus-side display control unit 51 generates various images to be displayed by the display apparatus 40. The control apparatus-side display control unit 51 outputs and displays the generated images onto the display apparatus 40.

The robot control unit 53 controls the robot 20 to allow the robot 20 to perform predetermined work.

Functional Configuration of Display Apparatus

The display apparatus 40 includes a memory (for convenience of explanation, referred to as "display apparatus-side memory 42"), a communication unit (for convenience of explanation, referred to as "display apparatus-side communication unit 44"), a display unit 46, and a control unit (for convenience of explanation, referred to as "display apparatus-side control unit 48").

The display apparatus-side memory 42 may include one or more of e.g. an HDD, SSD, EEPROM, ROM, and RAM. Note that the display apparatus-side memory 42 may be an external storage device connected via a digital input-output port such as a USB in place of the storage device provided in the display apparatus 40. The display apparatus-side memory stores various kinds of information, various images, various operation programs to be processed by the display apparatus 40.

The display apparatus-side communication unit 44 is an interface for communication with an external device.

The display apparatus-side communication unit 44 includes one or more of e.g. a digital input-output port such as a USB and a port of Ethernet (registered trademark).

The display unit 46 transmits visible light and displays various images.

The display apparatus-side control unit 48 controls the entire of the display apparatus 40. The display apparatus-side control unit 48 includes a display control unit (for convenience of explanation, referred to as "display apparatus-side display control unit 61"). The functional unit provided in the display apparatus-side control unit 48 is realized by e.g. a processor (not shown) executing various programs stored in the display apparatus-side memory 42. Further, the functional unit may be a hardware functional unit such as an LSI or ASIC.

The display apparatus-side display control unit 61 generates various images to be displayed by the display unit 46. The display apparatus-side display control unit outputs and displays the generated images onto the display unit 46.

Here, in the embodiment, for convenience of explanation, the configuration having both the function of generating an image by the robot control apparatus 30, transmitting the image from the robot control apparatus 30 to the display apparatus 40, and displaying the image by the display apparatus 40 and the function of generating an image by the display apparatus 40 and displaying the image by the display apparatus 40 is shown, and these functions are collectively explained, however, for example, a configuration having any one of these functions may be employed.

That is, the robot system 1 in which the robot control apparatus 30 generates an image and the display apparatus 40 displays the image may be formed, the robot system 1 in which the display apparatus 40 generates an image and displays the image may be formed, or the robot system 1 that can perform both image displays may be formed.

Image Generation Function in Robot Control Apparatus

The case where the control apparatus-side display control unit 51 of the robot control apparatus 30 generates an image to be displayed will be explained.

In the embodiment, the control apparatus-side display control unit 51 generates an image containing a virtual wall (for convenience of explanation, also referred to as "virtual wall image"), and allows the display apparatus 40 to display the generated virtual wall image.

Here, in the embodiment, the virtual wall is a wall virtually created on a virtual reality space and surrounding a robot as a reflection of the real robot 20 on the virtual reality space. The virtual wall is e.g. a wall having a region inside, to which the motion of the robot 20 is restricted, as a motion range of the robot 20. For example, the virtual wall may partition the same region as the above described region or partition a larger region than the above described region.

For the worker H, for example, when moving close to the robot 20 to the region inside of the virtual wall, the worker may contact the robot 20. In the embodiment, when the worker H contacts some virtual wall or when the worker H enters the region partitioned by the virtual wall, the robot control apparatus 30 brings the movable unit A of the robot 20 to an emergency stop.

The virtual wall is in the functional safety function of the robot 20 and, for example, the virtual wall may be set based on a risk assessment by the worker of the robot 20, or the motion range of the robot 20 may be calculated based on the action of the robot 20 and the virtual wall may be set based on the motion range.

Note that, as the virtual wall, a virtual wall having another definition may be used.

Or, the virtual wall may be specified using arbitrary information.

As an example, a single virtual wall may be specified using one or more feature values that can specify the virtual wall. As a specific example, when the virtual wall has a rectangular shape, the virtual wall can be specified using coordinates of vertexes of the rectangular shape as feature values.

As another example, a single virtual wall may be specified using coordinates of positions of a finite number of points on the surface of the virtual wall as feature values.

The control apparatus-side display control unit 51 calculates a distance between the virtual wall on the real space and the movable unit A of the robot 20. Here, the virtual wall on the real space refers to a wall, assuming that a virtual wall in the virtual reality space is placed on the real space in which the robot 20 and the worker H exist, corresponding to the virtual wall.

Further, the control apparatus-side display control unit 51 calculates a velocity of the movable unit A of the robot 20.

Furthermore, the control apparatus-side display control unit 51 acquires the worker position information from the position detection apparatus 25. Then, the control apparatus-side display control unit 51 calculates a distance between the virtual wall on the real space and the worker H based on the acquired worker position information.

In addition, the control apparatus-side display control unit 51 calculates an amount of change in posture of the movable unit A of the robot 20. The amount of change is e.g. an amount of change per predetermined unit time.

Here, in the robot control apparatus 30, when the robot 20 is controlled by the robot control unit 53, the position and the posture of the movable unit A of the robot 20, the velocity of the movable unit A of the robot 20, and the amount of change in posture of the movable unit A of the robot 20 are grasped. Thereby, the control apparatus-side display control unit 51 may specify these.

Further, in the robot control apparatus 30, when creation of a virtual wall image is performed by the control apparatus-side display control unit 51, the position and the posture of the virtual wall on the real space are grasped. Thereby, the control apparatus-side display control unit 51 may specify these.

Note that positions of other parts than the movable unit A of the robot 20 are e.g. fixed positions when work is performed by the movable unit A of the robot 20.

Similarly, postures of other parts than the movable unit A of the robot 20 are e.g. fixed postures when work is performed by the movable unit A of the robot 20.

In the embodiment, the control apparatus-side display control unit 51 measures the distance between the movable unit A of the robot 20 as a mobile part of the robot 20 and the virtual wall and controls the display form of the virtual wall based on the distance, however, as another example, the control apparatus-side display control unit 51 may measure a distance between an immobile part of the robot 20 and the virtual wall and control the display form of the virtual wall based on the distance. The immobile part of the robot 20 is e.g. the base B.

Here, for the position of the movable unit A of the robot 20, the posture of the movable unit A of the robot 20, the velocity of the movable unit A of the robot 20, and the amount of change in posture of the movable unit A of the robot 20, e.g. values with respect to an arbitrary location (part) of the movable unit A of the robot 20 or an arbitrary location near the movable unit A of the robot 20 may be used. As the location, e.g., each joint of the robot 20 or a control point of the robot 20 may be used. As the control point of the robot 20, e.g. TCP (Tool Center Point) as a virtual point associated with the distal end of the robot 20 may be used.

Further, as the velocity and the amount of change in posture of the movable unit A of the robot 20, e.g. an amount of change in pivot angle (angle of pivot) of each joint of the movable unit A may be used, or a statistical value of the amounts of change in pivot angle of the plurality of joints of the movable unit A may be used. As the statistical value, e.g. a summation value, product value of all, average value, weighted average value, or the like may be used. In this case, for example, the pivot angles of the respective joints of the movable unit A are obtained at each predetermined time.

The control apparatus-side display control unit 51 determines a display form of the virtual wall based on the distance between the virtual wall on the real space and the movable unit A of the robot 20 and the velocity of the movable unit A of the robot 20, and changes the display form of the virtual wall to the determined display form.

Further, for example, the control apparatus-side display control unit 51 determines a display form of the virtual wall based on the distance between the virtual wall on the real space and the worker H, and changes the display form of the virtual wall to the determined display form.

Furthermore, for example, the control apparatus-side display control unit 51 determines a display form of the virtual wall based on the amount of change in posture of the movable unit A of the robot 20, and changes the display form of the virtual wall to the determined display form.

For example, even when the distance between the virtual wall on the real space and the movable unit A of the robot 20 is shorter, if the velocity of the movable unit A of the robot 20 is lower, the control apparatus-side display control unit 51 may display the virtual wall in a display format that shows safety.

Further, for example, even when the distance between the virtual wall on the real space and the movable unit A of the robot 20 is longer, if the velocity of the movable unit A of the robot 20 is higher, the control apparatus-side display control unit 51 may display the virtual wall in a display format that shows risk.

Note that the velocity of the movable unit A of the robot 20 may be determined based on e.g. the amount of change in posture of the movable unit A (amount of posture change), and, as an example, the amount of change in posture of the movable unit A (amount of posture change) per predetermined unit time may be used as the velocity of the movable unit A. As a specific example, even when the movable unit A of the robot 20 and the virtual wall are in contact, if the amount of change in posture of the movable unit A is zero, the situation may be regarded as being safe.

Here, the type of the display form of the virtual wall changed based on the distance between the virtual wall on the real space and the movable unit A of the robot 20 and the type of the display form of the virtual wall changed based on the distance between the virtual wall on the real space and the worker H may be different. As an example, the type of the display form of the virtual wall changed based on the distance between the virtual wall on the real space and the movable unit A of the robot 20 may be a color of the virtual wall, and the type of the display form of the virtual wall changed based on the distance between the virtual wall on the real space and the worker H may be a thickness of a frame line of the virtual wall.

Here, as the display form of the virtual wall, various types of display forms may be changed. Types of parts of the virtual wall include e.g. vertexes of the virtual wall, lines connecting the vertexes of the virtual wall, and a plane surrounded by the lines connecting the vertexes of the virtual wall. Types of ways of display of the respective parts include e.g. sizes, thicknesses (widths) of points, thicknesses (widths) of lines, colors, transmission factors, and shapes.

When calculating the distance between the virtual wall on the real space and the worker H, the control apparatus-side display control unit 51 uses a predetermined value for the calculation. As the value, e.g. a value of a reach of an arm of a human may be used. The value of the reach of the arm of the human is a length of the stretched arm.

For example, as the value of the reach of the arm of the human, 850 mm as a safety distance for entrance of upper limbs shown in ISO 13855 may be set for the robot control apparatus 30.

More specifically, in ISO 13855, "safety distance for entrance of upper limbs", for arms to base points of shoulders, when openings are larger than 40 mm and equal to or smaller than 120 mm, with respect to rectangular, square, and circular openings, the safety distance is equal to or larger than 850 mm. Here, the dimension of the opening corresponds to a side of the square opening, a diameter of the circular opening, and the smallest dimension of the rectangular opening. Further, it covers people of 14 years and older. As described above, the height and the length of the arm of the human are defined in the safety standard.

When calculating the distance between the virtual wall on the real space and the worker H, for example, for a distance without consideration of the value of the reach of the arm of the human, the control apparatus-side display control unit 51 calculates a distance by subtraction of the value of the reach of the arm of the human, and thereby, the distance is set to be shorter by the value of the reach of the arm of the human. That is, the control apparatus-side display control unit 51 calculates a distance between the virtual wall on the real space and a tip of a finger assuming that the worker H stretches the arm. As another example, when calculating the distance between the virtual wall on the real space and the worker H, for example, for a distance without consideration of the value of the reach of the arm of the human, the control apparatus-side display control unit 51 may calculate another distance than the distance by subtraction of the value of the reach of the arm of the human.

In the embodiment, as the value of the reach of the arm of the worker H, a predetermined constant value is used, however, as another example, the worker H is captured by a camera provided in the robot system 1 and the value of the reach of the arm of the worker H may be detected based on the obtained image and used.

For example, the control apparatus-side display control unit 51 may determine the display format of the virtual wall based on current information, or determine the display format of the virtual wall based on information predicted for a future. As the information predicted for a future, information of e.g. a position of the movable unit A of the robot 20 predicted for a future, a posture of the movable unit A of the robot 20 predicted for a future, a position of the worker H predicted for a future, etc. may be used.

For example, the control apparatus-side display control unit 51 may determine the display form of the virtual wall based on the distance between the virtual wall on the real space and a position after a lapse of a predetermined time from the current position of the movable unit A of the robot 20. An arbitrary time may be used as the predetermined time.

Further, for example, the control apparatus-side display control unit 51 determines other properties than the display form of the virtual wall. As the other properties than the display form of the virtual wall, e.g. the position and the posture of the virtual wall may be used.

For example, the control apparatus-side display control unit 51 displays the virtual wall based on a trajectory in an action of the movable unit A of the robot 20.

Further, for example, when an action of the movable unit A of the robot 20 is changed, the control apparatus-side display control unit 51 changes the virtual wall according to the action of the movable unit A of the robot 20. For example, when the trajectory in the action of the movable unit A of the robot 20 is changed, the control apparatus-side display control unit 51 changes the virtual wall to display according to the change in trajectory.

Furthermore, for example, when an action of the movable unit A of the robot 20 is selected, the control apparatus-side display control unit 51 changes the virtual wall according to the selected action. The action may be selected based on e.g. an operation by a user or based on an instruction input from an external device.

In addition, for example, when receiving an instruction to display a region having a similarity shape to that of the region surrounded by the virtual wall from the user, the control apparatus-side display control unit 51 displays the region having the similarity shape. Thereby, scaling of the virtual wall is realized.

In the scaling, for example, with the shape of the region surrounded by the virtual wall kept, the region is enlarged or reduced.

Here, for example, the scaling may be performed based on a command received from the user or a command output from a predetermined device such as a USB. The command from the user is input and received via e.g. a user interface. The command from the predetermined device is input and received via e.g. an interface with the device.

Note that the user interface or the interface with the device may be respectively provided in arbitrary devices or may be provided in one or more apparatuses of e.g. the robot control apparatus 30, the display apparatus 40, or another information processing apparatus (not shown).

The display apparatus 40 may display an image in at least a part of the field of view of the worker H. Here, the display apparatus 40 acquires various images including the virtual wall image from the robot control apparatus 30. The display apparatus 40 allows the display unit 46 to display the acquired image.

As a specific example, when a virtual wall image is displayed on the display unit 46 of the display apparatus 40 while the worker H views the robot 20 on the real space via the display unit 46 of the display apparatus 40, the worker H views a space in which the robot 20 and the virtual wall exist.

Image Generation Function in Display Apparatus

The case where the display apparatus-side display control unit 61 of the display apparatus 40 generates an image to be displayed will be explained.

For example, the display apparatus-side display control unit 61 of the display apparatus 40 has a function of performing the same processing and control as generation processing and display of an image performed by the control apparatus-side display control unit 51 of the robot control apparatus 30.

In this case, the display apparatus-side display control unit 61 of the display apparatus 40 receives information acquirable by the control apparatus-side display control unit 51 of the robot control apparatus 30, but not acquirable by the display apparatus-side display control unit 61 of the display apparatus 40 from the robot control apparatus 30. The robot control apparatus 30 transmits the information to the display apparatus 40.

The information includes e.g. the worker position information transmitted from the position detection apparatus 25 to the robot control apparatus 30 and the information of the position and the posture of the movable unit A of the robot 20, the velocity of the movable unit A of the robot 20, and the amount of change in posture of the movable unit A of the robot 20 managed in the robot control apparatus 30.

As described above, in the embodiment, with respect to the generation and display of the image displayed on the display unit 46 of the display apparatus 40, the display apparatus-side display control unit 61 of the display apparatus 40 has substantially the same function as that of the control apparatus-side display control unit 51 of the robot control apparatus 30.

Here, in the embodiment, the case where the robot control apparatus 30 and the display apparatus 40 directly communicate is shown, however, as another example, an information processing apparatus (not shown) that relays the communication between the robot control apparatus 30 and the display apparatus 40 may be provided. In this case, information transmitted from the robot control apparatus 30 to the information processing apparatus via wireless or wired connection is received by the information processing apparatus and transmitted to the display apparatus 40 via wireless or wired connection. Further, information transmitted from the display apparatus 40 to the information processing apparatus via wireless or wired connection is received by the information processing apparatus and transmitted to the robot control apparatus 30 via wireless or wired connection.

For example, the information processing apparatus may have part of the functions of the display apparatus 40 as shown in FIG. 3 in place of the display apparatus 40. In the configuration, the display apparatus 40 and the information processing apparatus cooperatively operate, and thereby, realize the same functions as those of the display apparatus 40 as shown in FIG. 3.

For example, the information processing apparatus may be called a monitoring control apparatus.

Specific Example of Change in Display Form of Virtual Wall

Referring to FIGS. 4 to 7, a specific example of change in display form of the virtual wall will be explained.

Note that, as below, processing of changing the display form of the virtual wall by the control apparatus-side display control unit 51 of the robot control apparatus will be explained, however, the same applies to processing of changing the display form of the virtual wall by the display apparatus-side display control unit 61 of the display apparatus 40.

Figure 4:
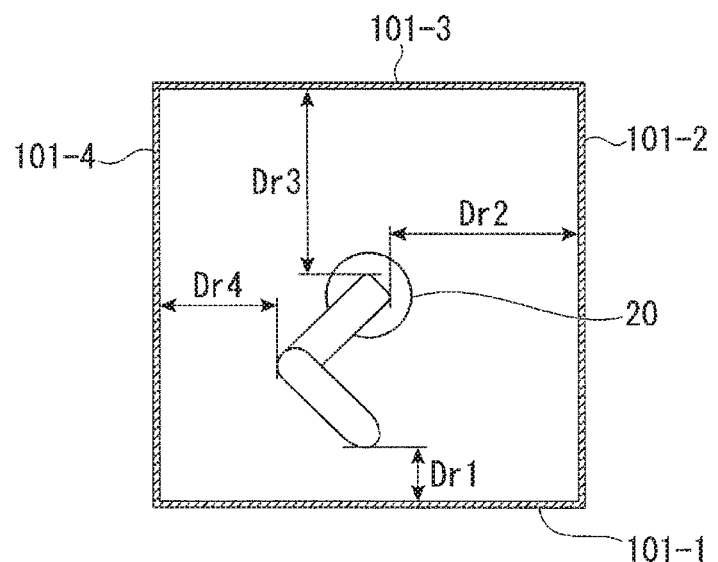
FIG. 4 shows an example of distances between virtual walls and a movable unit of a robot in consideration of a posture of the movable unit of the robot according to the one embodiment of the present disclosure.

FIG. 4 shows the example of the distances between the virtual walls (for convenience of explanation, referred to as "first virtual wall 101-1 to fourth virtual wall 101-4") and the movable unit A of the robot 20 in consideration of the posture of the movable unit A of the robot 20 according to the one embodiment of the present disclosure. Note that, in the example of FIG. 4, the robot 20 is simplified.

FIG. 4 shows the robot 20 in the real space and four walls corresponding to the four virtual walls reflected on the real space. In this example, for convenience of explanation, these four walls are shown as the first virtual wall 101-1, the second virtual wall 101-2, the third virtual wall 101-3, and the fourth virtual wall 101-4. In the example of FIG. 4, the movable unit A of the robot 20 takes a certain posture.

Further, FIG. 4 shows distances Dr1 to Dr4 between the respective virtual walls (first virtual wall 101-1 to fourth virtual wall 101-4) and the movable unit A of the robot 20 when the posture of the movable unit A of the robot 20 is considered.

Here, the example of FIG. 4 shows the first virtual wall 101-1 to fourth virtual wall 101-4 and the robot 20 as seen downward from above. In the example of FIG. 4, the four virtual walls (first virtual wall 101-1 to fourth virtual wall 101-4) are walls having surfaces parallel to the upward and downward directions.

The distances Dr1 to Dr4 between the respective virtual walls (first virtual wall 101-1 to fourth virtual wall 101-4) and the movable unit A of the robot 20 are the shortest distances between the movable unit A of the robot 20 and the respective virtual walls (first virtual wall 101-1 to fourth virtual wall 101-4) with respect to directions perpendicular to the surfaces (directions orthogonal to the surfaces) of the respective virtual walls (first virtual wall 101-1 to fourth virtual wall 101-4).

Note that, regarding the shortest distance, for example, a mathematical expression for obtaining the shortest distance may be set in advance and the shortest distance may be obtained based on the mathematical expression, or the shortest distance may be obtained by the so-called brute-force calculation.

In the embodiment, the position of the movable unit A of the robot 20 is different depending on the part of the movable unit A and depending on the posture of the movable unit A. When the distances between the movable unit A of the robot 20 and the surfaces of the respective virtual walls (first virtual wall 101-1 to fourth virtual wall 101-4) are obtained, for example, the part of the movable unit A is selected so that the distances may be the shortest.

The control apparatus-side display control unit controls degrees of warning based on the position relationships between the first virtual wall 101-1 to fourth virtual wall 101-4 and the robot 20.

In the embodiment, the control apparatus-side display control unit 51 increases the degrees of warning as the distances between the virtual walls (first virtual wall 101-1 to fourth virtual wall 101-4) and the movable unit A of the robot 20 in consideration of the posture of the movable unit A of the robot 20 are smaller.

In the example of FIG. 4, a magnitude relationship of the distances between the respective virtual walls (first virtual wall 101-1 to fourth virtual wall 101-4) and the movable unit A of the robot 20 is Dr1<Dr4<Dr2=Dr3. Accordingly, the degrees of warning based on the distances between the virtual walls (first virtual wall 101-1 to fourth virtual wall 101-4) and the movable unit A of the robot 20 sequentially descend from the first virtual wall 101-1, the fourth virtual wall 101-4, to the second virtual wall 101-2 and the third virtual wall 101-3. Here, the degrees of warning are the same between the second virtual wall 101-2 and the third virtual wall 101-3.

Further, the control apparatus-side display control unit 51 controls the degrees of warning based on the velocity of the movable unit A.

In the embodiment, the control apparatus-side display control unit 51 increases all of the virtual walls so that the degrees of warning may be larger as the amount of change in posture per unit time of the movable unit A of the robot 20 is larger. The magnitude of the amount of change in posture per unit time of the robot 20 represents magnitude of the velocity of the action of the robot 20.

For example, when the movable unit A of the robot 20 moves at a higher velocity in a continuous operation status, the degrees of warning are larger. On the other hand, when the movable unit A of the robot 20 moves at a lower velocity in a stop status or direct teaching, the degrees of warning are smaller.

Figure 5:
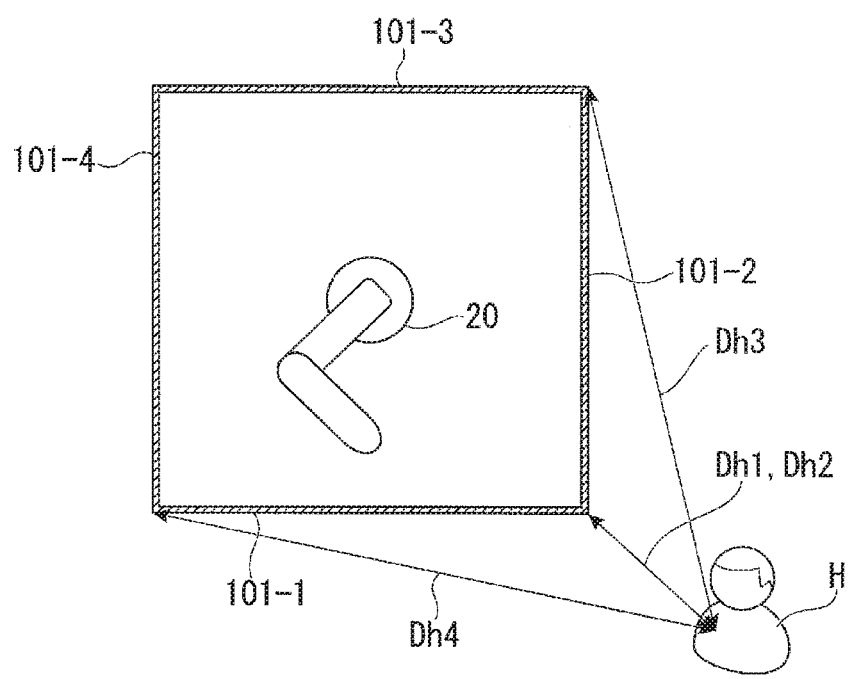
FIG. 5 shows an example of distances between the virtual walls and a worker according to the one embodiment of the present disclosure.

FIG. 5 shows the example of the distances between the virtual walls (first virtual wall 101-1 to fourth virtual wall 101-4) and the worker H according to the one embodiment of the present disclosure. Note that, in the example of FIG. 4, the robot 20 is simplified.

In the embodiment, the worker H wears the display apparatus 40.

FIG. 5 shows the worker H in the real space and four walls corresponding to the four virtual walls reflected on the real space. In this example, for convenience of explanation, these four walls are shown as the first virtual wall 101-1 to fourth virtual wall 101-4.

Further, FIG. 5 shows distances Dh1 to Dh4 between the respective virtual walls (first virtual wall 101-1 to fourth virtual wall 101-4) and the worker H.

Here, the example of FIG. 5 shows the first virtual wall 101-1 to fourth virtual wall 101-4 and the robot 20 as seen downward from above. In the example of FIG. 5, the four virtual walls (first virtual wall 101-1 to fourth virtual wall 101-4) are walls having surfaces parallel to the upward and downward directions. These four virtual walls (first virtual wall 101-1 to fourth virtual wall 101-4) are the same as those shown in FIG. 4.

The distances Dh1 to Dh4 between the respective virtual walls (first virtual wall 101-1 to fourth virtual wall 101-4) and the worker H are the shortest distances between the worker H and the surfaces of the respective virtual walls (first virtual wall 101-1 to fourth virtual wall 101-4) with respect to directions perpendicular to the surfaces (directions orthogonal to the surfaces) of the respective virtual walls (first virtual wall 101-1 to fourth virtual wall 101-4).

Note that, regarding the shortest distance, a mathematical expression for obtaining the shortest distance may be set in advance and the shortest distance may be obtained based on the mathematical expression, or the shortest distance may be obtained by the so-called brute-force calculation.

In the embodiment, the position of the worker H is a point. Further, in the embodiment, the position of the worker H is e.g. a position of the finger tip when the worker H stretches the arm in the directions of the shortest distances from the respective virtual walls (first virtual wall 101-1 to fourth virtual wall 101-4).

The control apparatus-side display control unit controls degrees of warning based on the position relationships between the first virtual wall 101-1 to fourth virtual wall 101-4 and the worker H.

In the embodiment, the control apparatus-side display control unit 51 increases the degrees of warning as the distances between the virtual walls (first virtual wall 101-1 to fourth virtual wall 101-4) and the worker H are smaller.

In the example of FIG. 5, a magnitude relationship of the distances between the respective virtual walls (first virtual wall 101-1 to fourth virtual wall 101-4) and worker H is Dh1=Dh2<Dh3=Dh4. Accordingly, the degrees of warning based on the distances between the virtual walls (first virtual wall 101-1 to fourth virtual wall 101-4) and the worker H sequentially descend from the first virtual wall 101-1 and the second virtual wall 101-2 to the third virtual wall 101-3 and the fourth virtual wall 101-4. Here, the degrees of warning are the same between the first virtual wall 101-1 and the second virtual wall 101-2. Further, the degrees of warning are the same between the third virtual wall 101-3 and the fourth virtual wall 101-4.

Figure 6:
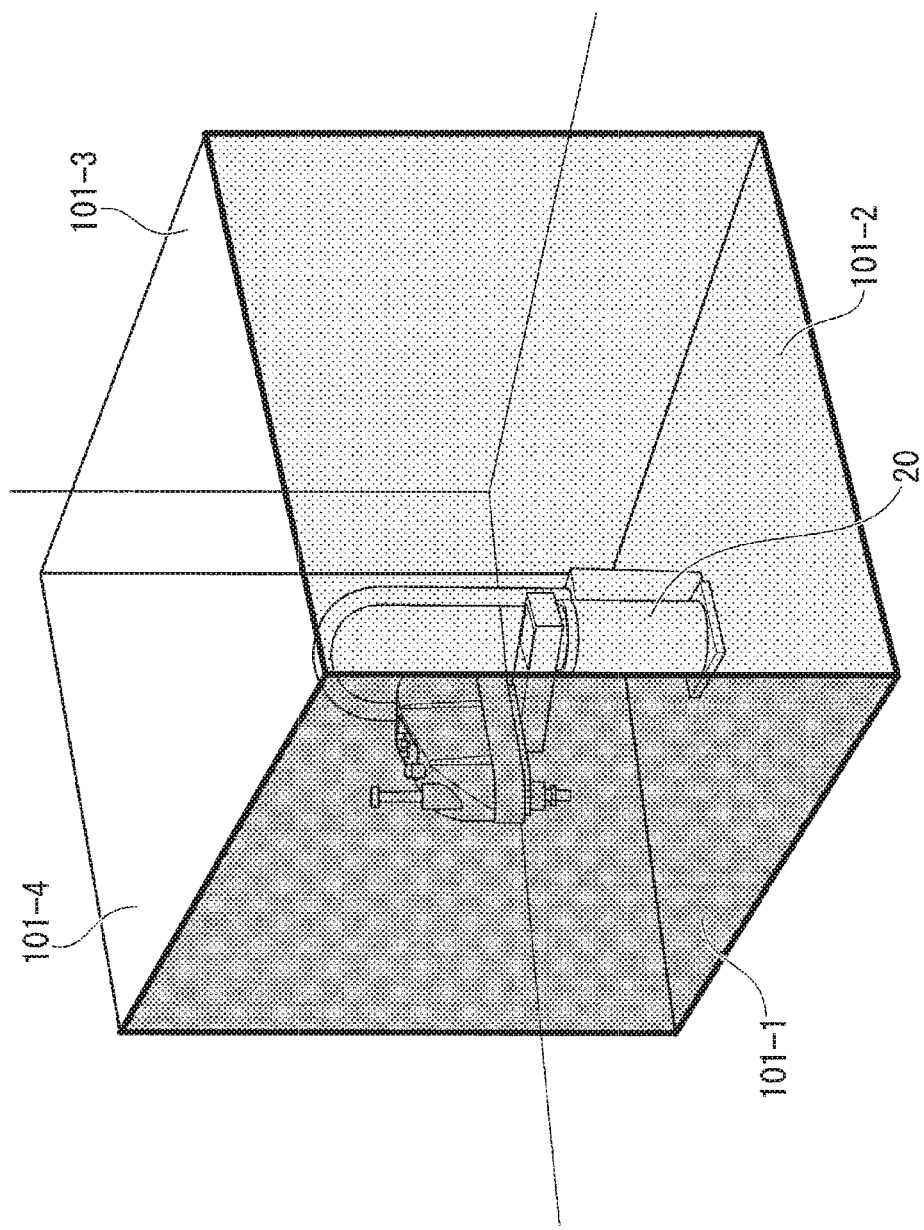
FIG. 6 shows an example of the virtual walls displayed on the display apparatus according to the one embodiment of the present disclosure.

FIG. 6 shows the example of the virtual walls (first virtual wall 101-1 to fourth virtual wall 101-4) displayed on the display apparatus 40 according to the one embodiment of the present disclosure. Note that, in the example of FIG. 6, the display forms of the virtual walls (first virtual wall 101-1 to fourth virtual wall 101-4) are schematically shown, and the colors may be different from real colors, for example.

Here, for example, the virtual walls (first virtual wall 101-1 to fourth virtual wall 101-4) are the same as those shown in the example of FIG. 4 and the example of FIG. 5.

In the example of FIG. 6, the four virtual walls (first virtual wall 101-1 to fourth virtual wall 101-4) are set to surround the robot 20.

In the embodiment, the control apparatus-side display control unit 51 shows degrees of warning based on the distances between the respective virtual walls (first virtual wall 101-1 to fourth virtual wall 101-4) and the movable unit A of the robot 20 and the velocity of the movable unit A of the robot 20 by controlling colors of the surfaces formed by the vertexes of the respective virtual walls (first virtual wall 101-1 to fourth virtual wall 101-4). As a specific example, the control apparatus-side display control unit 51 sets the color to red when the degree of warning is high, that is, equal to or larger than a threshold value and sets the color to green when the degree of warning is low, that is, smaller than the threshold value.

Here, for example, three or more correspondences may be used for the correspondences between the degrees of warning and the colors, and correspondences between ranges of the degrees of warning and the colors are set in the control apparatus-side display control unit 51. Note that the degrees of warning are expressed by values based on e.g. the distances between the respective virtual walls (first virtual wall 101-1 to fourth virtual wall 101-4) and the movable unit A of the robot 20 and the velocity of the movable unit A of the robot 20.

For color changes, for example, discrete color changes may be used according to the degrees of warning, or continuous color changes e.g. gradations of colors may be used according to the degrees of warning.

In the embodiment, the control apparatus-side display control unit 51 expresses degrees of warning based on distances between the respective virtual walls (first virtual wall 101-1 to fourth virtual wall 101-4) and the worker H by controlling thicknesses of lines connecting the vertexes of the virtual walls (first virtual wall 101-1 to fourth virtual wall 101-4). As a specific example, the control apparatus-side display control unit 51 makes the line thicker when the degree of warning is high, that is, equal to or larger than a predetermined threshold value and makes the line thinner when the degree of warning is low, that is, smaller than the predetermined threshold value.

Further, in the example of FIG. 6, the surfaces of the respective virtual walls (first virtual wall 101-1 to fourth virtual wall 101-4) are translucently displayed. The translucence is at a transmission factor substantially from 50% to 60%, for example.

Note that the example of FIG. 6 is just an example of the display format of the virtual walls (first virtual wall 101-1 to fourth virtual wall 101-4), and other various formats may be used.

Figure 7:
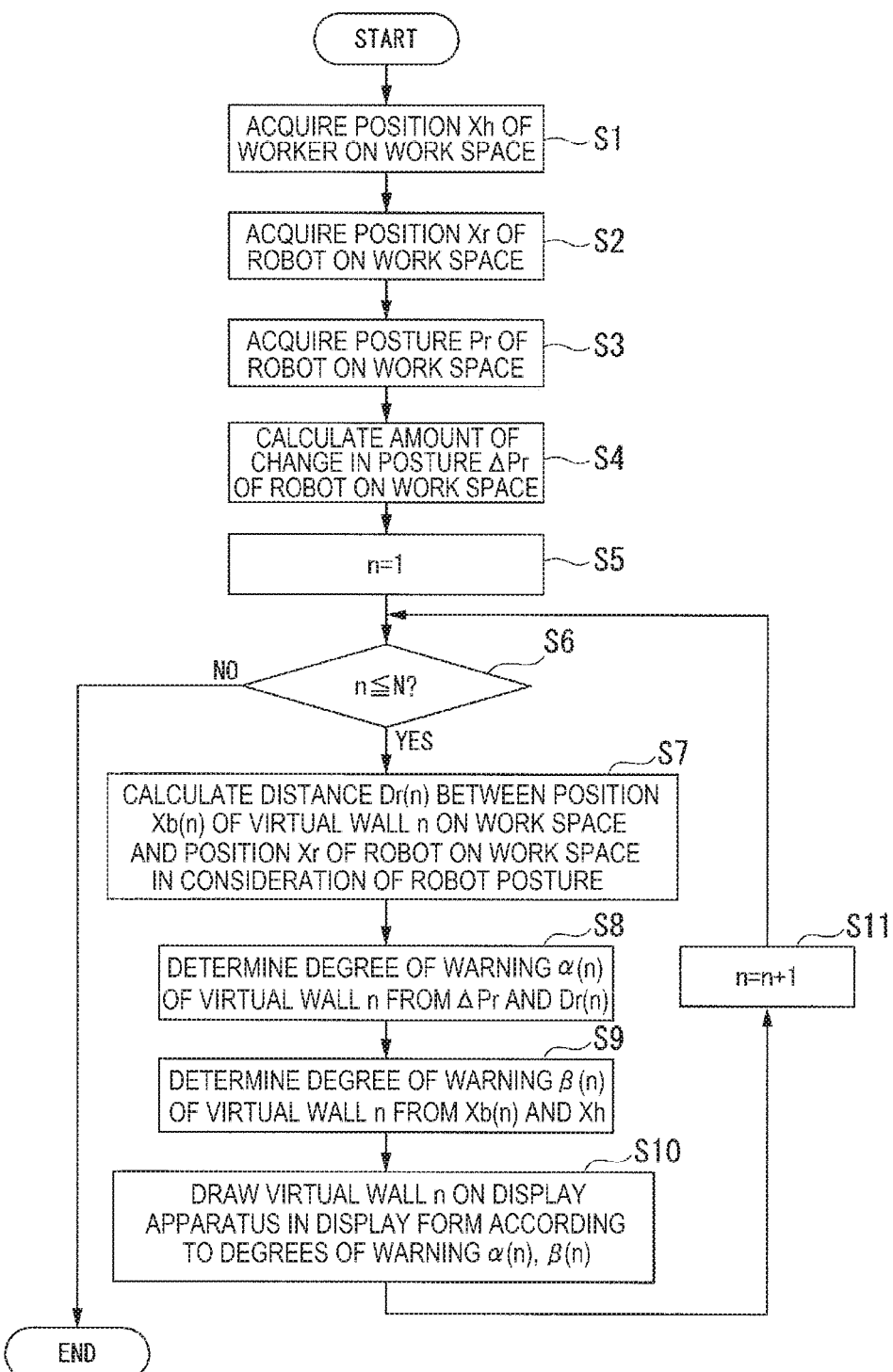
FIG. 7 shows an example of a procedure of processing of changing a display format of the virtual walls performed by a display control unit according to the one embodiment of the present disclosure.

FIG. 7 shows the example of the procedure of processing of changing the display format of the virtual walls performed by the control apparatus-side display control unit 51 according to the one embodiment of the present disclosure.

In this example, the case where N (N is an integer equal to or larger than one) virtual walls are created is explained. In the example of FIG. 4 and the example of FIG. 5, n=4. Further, the respective numbers of the virtual walls are indicated by n (n is an integer from one to N).

Note that, in the embodiment, in order to express the position relationships between the virtual walls existing in the virtual reality space and the robot 20 and the worker H existing in the real space, the position relationships are expressed on the assumption that these exist in the real space. However, the position relationships may be expressed on the assumption that these exist in the virtual reality space, or the position relationships may be expressed on the assumption that these exist in the other same space.

Here, for example, the control apparatus-side display control unit 51 specifies a region of the sense of vision of the worker H in the real space as the virtual reality space based on the position of the worker H, and associates the real space with the virtual reality space. Then, the control apparatus-side display control unit 51 may associate the position and the posture of the robot 20, the position of the worker H, etc. existing in the real space with the positions and postures of the virtual walls existing in the virtual reality space etc. in the same space. This association may be made based on e.g. a correspondence relationship between three-dimensional coordinates in the real space and three-dimensional coordinates in the virtual reality space. Note that arbitrary coordinate systems may be respectively used for the three-dimensional coordinates in the real space and the three-dimensional coordinates in the virtual reality space.

In the example of FIG. 7, a work space shows the real space. Further, the nth virtual wall is referred to as "virtual wall n" in the explanation.

Step S1

The control apparatus-side display control unit 51 acquires a position Xh of the worker H on the work space. Then, the unit moves to processing at step S2.

In the embodiment, as the position Xh, the position of the display apparatus 40 worn by the worker H is used.

Step S2

The control apparatus-side display control unit 51 acquires a position Xr of the robot 20 on the work space. Then, the unit moves to processing at step S3.

Step S3

The control apparatus-side display control unit 51 acquires a posture Pr of the robot 20 on the work space. Then, the unit moves to processing at step S4.

Step S4

The control apparatus-side display control unit 51 acquires an amount of change ΔPr of the posture Pr of the robot 20 on the work space. Then, the unit moves to processing at step S5.

Step S5

The control apparatus-side display control unit 51 sets n to one. Then, the unit moves to processing at step S6.

Step S6

The control apparatus-side display control unit 51 determines whether or not n is equal to or smaller than N.

As a result of the determination, when the control apparatus-side display control unit 51 determines that n is equal to or smaller than N (step S6: YES), the unit moves to processing at step S7.

On the other hand, as a result of the determination, when the control apparatus-side display control unit 51 determines that n is not equal to or smaller than N (step S6: NO), the unit ends the processing of this flow.

Step S7

The control apparatus-side display control unit 51 calculates a distance Dr(n) between a position Xb(n) of the virtual wall n on the work space and the position Xr of the robot 20 on the work space. Then, the unit moves to processing at step S8. Here, the distance Dr(n) is a distance in consideration of the posture Pr of the robot 20 on the work space.

Step S8

The control apparatus-side display control unit 51 determines a degree of warning α(n) with respect to the virtual wall n based on the amount of change ΔPr of the posture Pr of the robot 20 on the work space and the distance Dr(n). Then, the unit moves to processing at step S9.

In this example, the degree of warning α(n) may vary depending on magnitude of the distance Dr(n) between the position Xb(n) of the virtual wall n on the work space and the position Xr of the robot 20 on the work space.

Further, in this example, the degree of warning α(n) may vary depending on the magnitude of the amount of change ΔPr of the posture Pr of the robot 20 on the work space.

Step S9

The control apparatus-side display control unit 51 determines a degree of warning β(n) with respect to the virtual wall n based on the position Xb(n) of the virtual wall n on the work space and the position Xh of the worker H on the work space. Then, the unit moves to processing at step S10.

In this example, the degree of warning β(n) may vary depending on magnitude of a distance Dh(n) between the position Xb(n) of the virtual wall n on the work space and the position Xh of the worker H on the work space.

Step S10

The control apparatus-side display control unit 51 allows the display apparatus 40 to draw and display the virtual wall n in a display form according to the degree of warning α(n) and the degree of warning β(n). Then, the unit moves to processing at step S11.

Thereby, the degree of warning α(n) and the degree of warning β(n) are reflected on the display format at the same time.

Step S11

The control apparatus-side display control unit 51 adds one to n. Then, the unit moves to the processing at step S6.

Here, in this example, the correspondence relationship among the distance Dr(n) between the position Xb(n) of the virtual wall n on the work space and the position Xr of the robot 20 on the work space, the distance Dh(n) between the position Xb(n) of the virtual wall n on the work space and the position Xh of the worker H on the work space, and the amount of change ΔPr of the posture Pr of the robot 20 on the work space and the degree of warning α(n) are set in advance. The correspondence relationship may be set using e.g. one or more threshold values with respect to the distance Dr(n), one or more threshold values with respect to the distance Dh(n), and one or more threshold values with respect to the amount of change ΔPr of the posture Pr.

Further, in the example of FIG. 7, the case where the display form of the virtual wall n is determined based on the two kinds of degrees of warning of the degree of warning α(n) and the degree of warning β(n) is shown. However, as another example, the display form of the virtual wall n may be determined based on the degree of warning α(n) and, in this case, the determination of the degree of warning β(n) is not necessarily required and the processing of obtaining the degree of warning β(n) is not necessarily required.

Furthermore, in the example of FIG. 7, the case where the virtual wall n displayed for the robot 20 is set in advance and the display form of the virtual wall n is changed is explained. In this case, an arbitrary method may be used as the method of determining the virtual wall n displayed for the robot 20.

In the method of determining the virtual wall n displayed for the robot 20, for example, the position and the posture of the virtual wall n may be determined. Or, an initial display form of the virtual wall n may be set.

In the embodiment, the display form of the virtual wall n is changed based on the degrees of warning α(n), β(n) to the worker H.

Further, in the embodiment, the case where a warning is issued to the worker H wearing the display apparatus 40 is shown, however, for example, the worker H wearing the display apparatus 40 may let a human not wearing the display apparatus 40 to know that the warning is issued. That is, when the human not wearing the display apparatus 40 performs work near the robot 20, the worker H wearing the display apparatus 40 may monitor presence or absence of a warning and, when there is a warning, may send the warning to the human.

Display of Virtual Wall Based on Future Prediction

Here, for example, not only display of the virtual wall and change of the display form of the virtual wall are performed based on the current information on the robot 20 but also display of the virtual wall and change of the display form of the virtual wall may be performed based on e.g. information predicted for the future on the robot 20.

As the future, an arbitrary future for the present may be used and e.g. a future after one second, future after two seconds, or a future after one minute, future after ten minutes, or the like may be used.

Or, for example, a virtual wall based on the current information on the robot 20 and a virtual wall based on information predicted for a future on the robot 20 may be displayed at the same time in different display forms. In this case, the virtual wall based on information predicted for the future on the robot 20 may include a plurality of virtual walls for futures respectively corresponding to a plurality of times. The plurality of times in the future may be arbitrary times or a plurality of times at fixed time intervals e.g. after one second, after two seconds, after three seconds, etc.

Or, for example, a virtual wall based on the current information on the robot 20 is not displayed, but virtual walls of one or more futures may be displayed.

As the different display forms, arbitrary display forms may be used and, e.g. colors or transmission factors of surfaces of virtual walls may be set for the different display forms.

Further, when virtual walls at a plurality of times (two or more times of the present or one or more futures) are displayed at the same, for example, in a part in which two or more virtual walls overlap, the display form of the virtual wall at the highest degree of warning may be preferentially used for display.

The information predicted for a future on the robot 20 may be acquired using an arbitrary method. For example, the information predicted for a future on the robot 20 may be acquired on the assumption that the same situation continues based on one or both of the current information and the past information on the robot 20. As an example, a position and a posture of the movable unit A of the robot in the future can be predicted based on the current position and posture of the movable unit A of the robot 20 and a way that the position and the posture change. As the way that the position and the posture change, a velocity of the change may be used.

Specific Example of Determination of Displayed Virtual Walls

Figure 8:
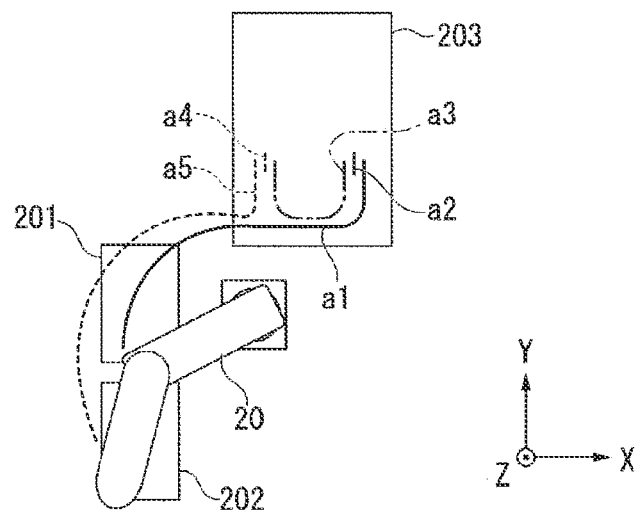
FIG. 8 shows an example of a motion path of the robot according to the one embodiment of the present disclosure.

Referring to FIG. 8, a specific example of determination of displayed virtual walls will be explained.

Note that, as below, processing of determining virtual walls displayed by the control apparatus-side display control unit 51 of the robot control apparatus 30 will be explained as an example, however, the same applies to processing of determining virtual walls displayed by the display apparatus-side display control unit 61 of the display apparatus 40.

Preparation Executed by User

In order to enable the robot control apparatus 30 to automatically set virtual walls, the user teaches a path of an action of the robot 20 to the robot control apparatus 30 and allows the robot control apparatus 30 to execute a simulation of the action of the robot 20 in advance. Here, as teaching, arbitrary teaching may be performed and, in the embodiment, teaching with respect to each point is performed.

Note that the user may be e.g. the worker H or any other human.

In the embodiment, the control apparatus-side display control unit 51 of the robot control apparatus 30 executes various kinds of processing of a simulation of an action of the robot 20, display of a result of the simulation, an analysis of the result of the simulation, setting of virtual walls, etc.

In the embodiment, as action commands, GO commands and MOVE commands are used.

The GO command is a Point-to-Point action command by which positions of two points are designated and an action from the position of one point to the position of the other point of the two points is commanded.

The MOVE command is a command of an action by which a shape of a path is designated, e.g. an action along a linear path.

FIG. 8 shows the example of the motion path of the robot 20 according to the one embodiment of the present disclosure. In the example of FIG. 8, the robot 20 is simplified.

FIG. 8 shows the robot 20, an unprocessed component pallet 201 as a pallet on which components before processing are mounted, and a processed component pallet 202 as a pallet on which components after processing are mounted, a processing machine 203 as a machine for processing as an example of a work environment in the robot system 1.

For convenience of explanation, FIG. 8 shows axes of an XYZ orthogonal coordinate system.

Further, FIG. 8 shows an example of an XYZ three-dimensional orthogonal coordinate system.

In the example of FIG. 8, the robot 20 performs (Processing D1) to (Processing D5).

(Processing D1) is processing of bringing a component to be processed from the unprocessed component pallet 201 to before the processing machine 203 by the robot 20. FIG. 8 shows a path of (Processing D1) (for convenience of explanation, referred to as "first path a1"). (Processing D1) is instructed by e.g. the GO command.

(Processing D2) is processing of carrying the component to a supply port of the processing machine 203 by the robot 20. FIG. 8 shows a path of (Processing D2) (for convenience of explanation, referred to as "second path a2"). (Processing D2) is instructed by e.g. the MOVE command.

(Processing D3) is processing, after supplying the component to the processing machine 203, of moving the processed component to a position to receive from the processing machine 203 by the robot 20. FIG. 8 shows a path of (Processing D3) (for convenience of explanation, referred to as "third path a3"). (Processing D3) is instructed by the MOVE command.

(Processing D4) is processing of receiving the processed component by the robot 20. FIG. 8 shows a path of (Processing D4) (for convenience of explanation, referred to as "fourth path a4"). (Processing D4) is instructed by e.g. the MOVE command.

(Processing D5) is processing of bringing the processed component to the processed component pallet 202 by the robot 20. FIG. 8 shows a path of (Processing D5) (for convenience of explanation, referred to as "fifth path a5"). (Processing D5) is instructed by e.g. the GO command.

Example of User Interface

In the embodiment, as a user interface, a screen of an information processing apparatus (not shown) communicably connected to the robot control apparatus 30 via wireless or wired connection is used. The information processing apparatus is e.g. a computer.

As a method of giving an instruction to create a virtual wall in a simulation space by the user, e.g. a method of development by describing a command to an action desired to create the virtual wall on a programming basis is used. Alternatively, a method of development by dragging a code of the action desired to create the virtual wall and opening a wizard for setting is used.

Example of Source Code

Figure 9:
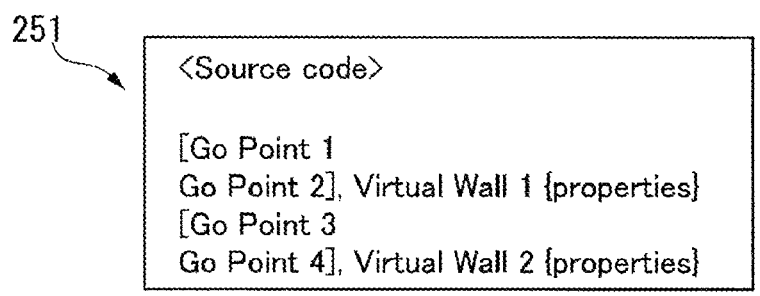
FIG. 9 shows an example of a source code according to the one embodiment of the present disclosure.

FIG. 9 shows the example of the source code (for convenience of explanation, referred to as "first source code 251") according to the one embodiment of the present disclosure.

The first source code 251 is described by the user.

For example, in an execution command ([Go Point 1 Go Point 2]) of processing in which a first position (Point 1) as a start point and a second position (Point 2) as an end point are designated, an execution command of processing of creating the first virtual wall (Virtual Wall 1 {properties}) is designated.

Similarly, in an execution command of processing ([Go Point 3 Go Point 4]) in which a third position (Point 3) as a start point and a fourth position (Point 4) as an end point are designated, an execution command of processing of creating the second virtual wall (Virtual Wall 2 {properties}) is designated.

Note that, in the processing of creating the virtual wall, the properties may be designated.

Figure 10:
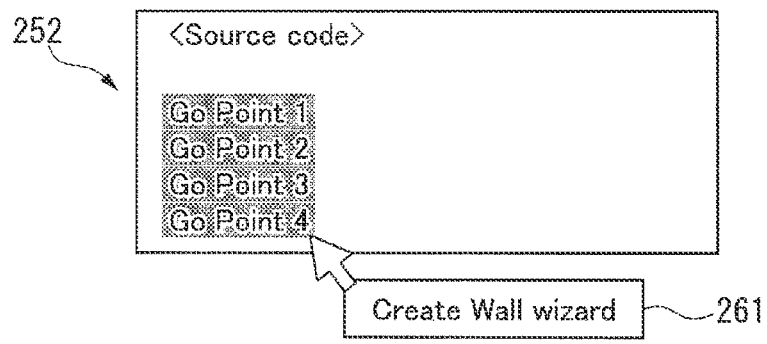
FIG. 10 shows another example of the source code according to the one embodiment of the present disclosure.

FIG. 10 shows the other example of the source code (for convenience of explanation, referred to as "second source code 252") according to the one embodiment of the present disclosure.

The second source code 252 is described by the user.

A predetermined wizard 261 is pop-up displayed while the execution command of processing in which the first position (Point 1) is designated (Go Point 1), the execution command of processing in which the second position (Point 2) is designated (Go Point 2), the execution command of processing in which the third position (Point 3) is designated (Go Point 3), and the execution command of processing in which the fourth position (Point 4) is designated (Go Point 4) are selected according to clicking of a mouse or the like. The predetermined wizard 261 is a wizard for instructing creation of the virtual wall and, when the wizard is designated, processing of creating the virtual wall is executed.

Modeling of Robot

For setting the virtual walls in consideration of the entire of the robot 20, the robot 20 is modeled.

In the embodiment, the control apparatus-side display control unit 51 of the robot control apparatus 30 models the arms of the respective axes (first arm A1, second arm A2) of the robot 20 using a rectangular parallelepiped or cubic approximate model.

Note that, as another example, the modeling may be performed by the user or the like and a result of the modeling may be set in the robot control apparatus 30 and used by the control apparatus-side display control unit 51.

Figure 11:
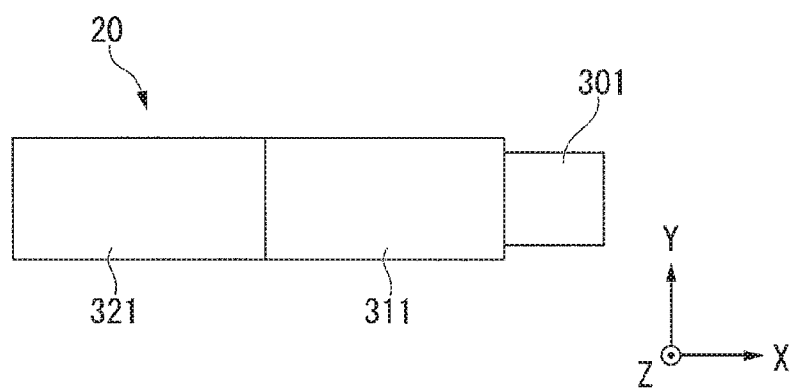
FIG. 11 shows an example of modeling of the robot according to the one embodiment of the present disclosure.

FIG. 11 shows the example of modeling of the robot 20 according to the one embodiment of the present disclosure.

In the embodiment, regarding the case where the robot 20 is seen in the upward and downward directions, the part of the base B is simplified to a rectangular base part 301, the part of the first arm A1 is simplified to a rectangular first arm part 311, the part of the second arm A2 is simplified to a rectangular second arm part 312, and thereby, the robot 20 is modeled in a simple shape.

Further, for convenience of explanation, FIG. 11 shows axes of an XYZ orthogonal coordinate system.

Here, as modeling, any other modeling method may be used.

For example, more detailed modeling is performed using a polygon model such as e.g. a CAD (Computer Aided Design) model, and thereby, a result of a more detailed simulation can be obtained.

Results of Simulations at Respective Times

Figure 12:
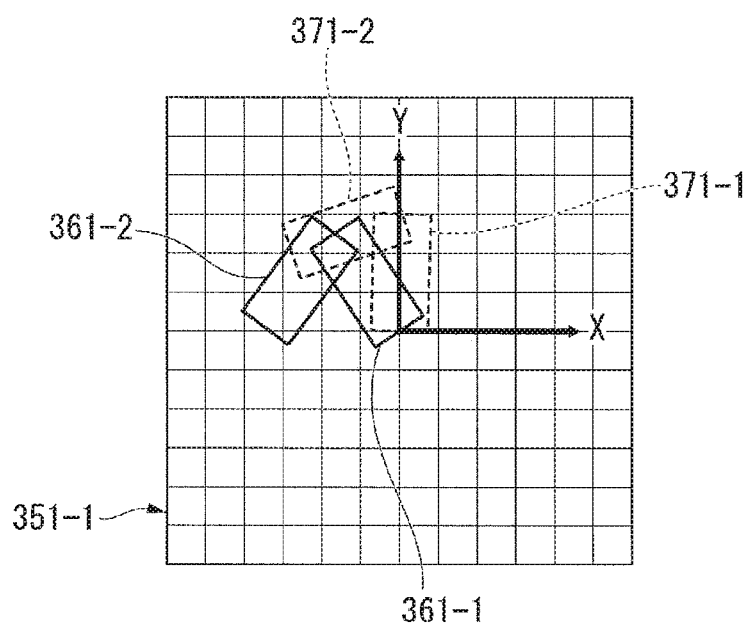
FIG. 12 shows examples of positions of a modeled robot at each time according to one embodiment of the present disclosure.
Figure 13:
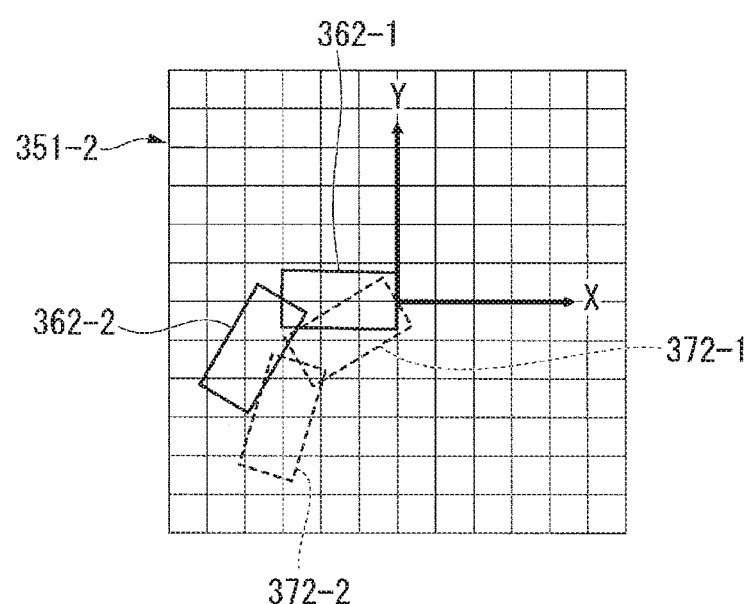
FIG. 13 shows examples of positions of the modeled robot at each time according to the one embodiment of the present disclosure.

FIGS. 12 and 13 respectively show examples of positions of the modeled robot 20 at each time according to the one embodiment of the present disclosure.

For convenience of explanation, FIGS. 12 and 13 each show axes of an XYZ orthogonal coordinate system.

FIGS. 12 and 13 each show positions of the modeled robot 20 at the respective times as results of simulations of actions of the robot 20.

For example, the simulation results are displayed on a screen as a user interface by the control apparatus-side display control unit 51 of the robot control apparatus 30.

Note that, in the example of FIG. 12 and the example of FIG. 13, illustration of the base part 301 fixed in the embodiment is omitted.

Further, in the example of FIG. 12 and the example of FIG. 13, meshes that may be used for setting the virtual walls (for convenience of explanation, referred to as "first mesh 351-1" and "second mesh 351-2") are shown. The first mesh 351-1 and the second mesh 351-2 include a plurality of straight lines arranged at fixed intervals and a plurality of straight lines arranged orthogonal to the straight lines at fixed intervals. For example, the sizes of the intervals of the first mesh 351-1 and the second mesh 351-2 can be arbitrarily changed by the user or the like.

Note that, as another example, the first mesh 351-1 and the second mesh 351-2 are not necessarily displayed.

In the example of FIG. 12, a simulation result of positions of the modeled robot 20 at a certain time t1 is shown.

Specifically, as positions when the robot 20 is controlled by the robot control apparatus 30, a position of the first arm part 311 (for convenience of explanation, referred to as "first position 361-1") and a position of the second arm part 312 (for convenience of explanation, referred to as "second position 361-2") are shown. Further, as positions that may be reached by the robot 20 on the assumption that an emergency stop command is issued to the robot 20, a position of the first arm part 311 (for convenience of explanation, referred to as "third position 371-1") and a position of the second arm part 312 (for convenience of explanation, referred to as "fourth position 371-2") are shown.

In the example of FIG. 13, a simulation result of positions of the modeled robot 20 at another time t2 is shown.

Specifically, as positions when the robot 20 is controlled by the robot control apparatus 30, a position of the first arm part 311 (for convenience of explanation, referred to as "fifth position 362-1") and a position of the second arm part 312 (for convenience of explanation, referred to as "sixth position 362-2") are shown. Further, as positions that may be reached by the robot 20 on the assumption that an emergency stop command is issued to the robot 20, a position of the first arm part 311 (for convenience of explanation, referred to as "seventh position 372-1") and a position of the second arm part 312 (for convenience of explanation, referred to as "eighth position 372-2") are shown.

Further, similarly to the example of FIG. 12 and the example of FIG. 13, regarding other times t in the simulation, positions when the robot 20 is controlled by the robot control apparatus 30 and positions that may be reached by the robot 20 on the assumption that an emergency stop command is issued to the robot 20 are acquired.

Note that, for example, the emergency stop command is transmitted from the robot control apparatus 30 to the robot 20, and the robot 20 performs free running operation and makes an emergency stop.

Further, when the robot 20 stops, the emergency stop is not necessarily considered.

Superimposition of Simulation Results at all Times

Simulation results at all times are superimposed, and thereby, a region through which the robot 20 may pass when an action of the robot 20 taught by the user is performed is generated.

Figure 14:
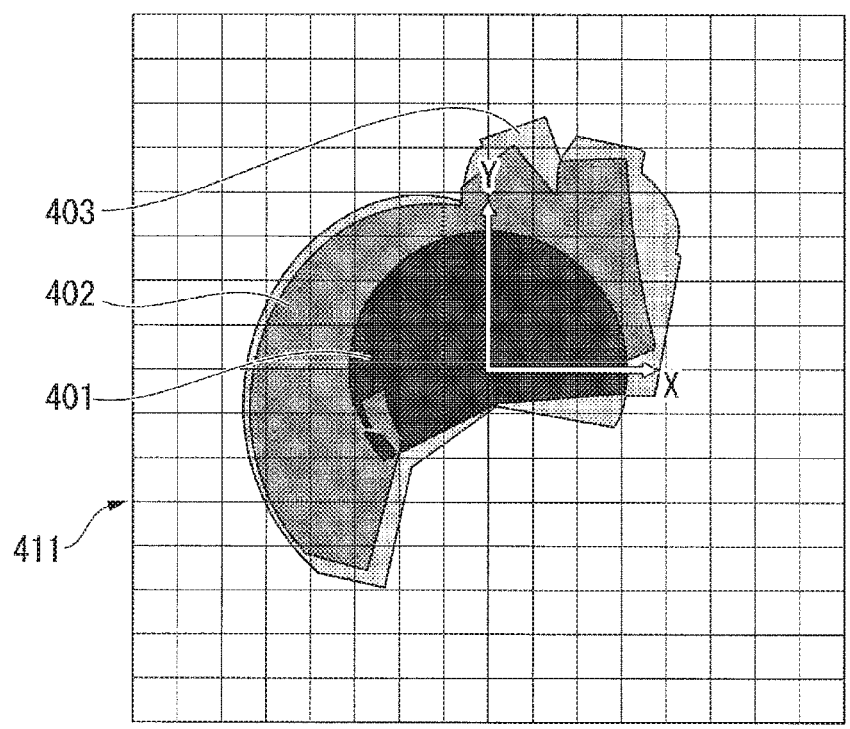
FIG. 14 shows examples of regions through which the modeled robot may pass according to the one embodiment of the present disclosure.

FIG. 14 shows examples of the regions through which the modeled robot may pass according to the one embodiment of the present disclosure.

For convenience of explanation, FIG. 14 shows axes of an XYZ orthogonal coordinate system.

FIG. 14 shows a mesh (for convenience of explanation, referred to as "third mesh 411").

FIG. 14 shows a region through which the first arm part 311 may pass when the robot 20 performs a normal operation (for convenience of explanation, referred to as "first region 401"), a region through which the second arm part 312 may pass when the robot 20 performs the normal operation (for convenience of explanation, referred to as "second region 402"), and a region through which the first arm part 311 and the second arm part 312 may pass when the robot 20 performs a free running operation (for convenience of explanation, referred to as "third region 403").

Here, the normal operation refers to an operation when the emergency stop command is not issued.

Generation of Safety Region

The control apparatus-side display control unit 51 of the robot control apparatus 30 sets a region formed by positions that the robot 20 does not reach as a safety region based on simulation results.

Figure 15:
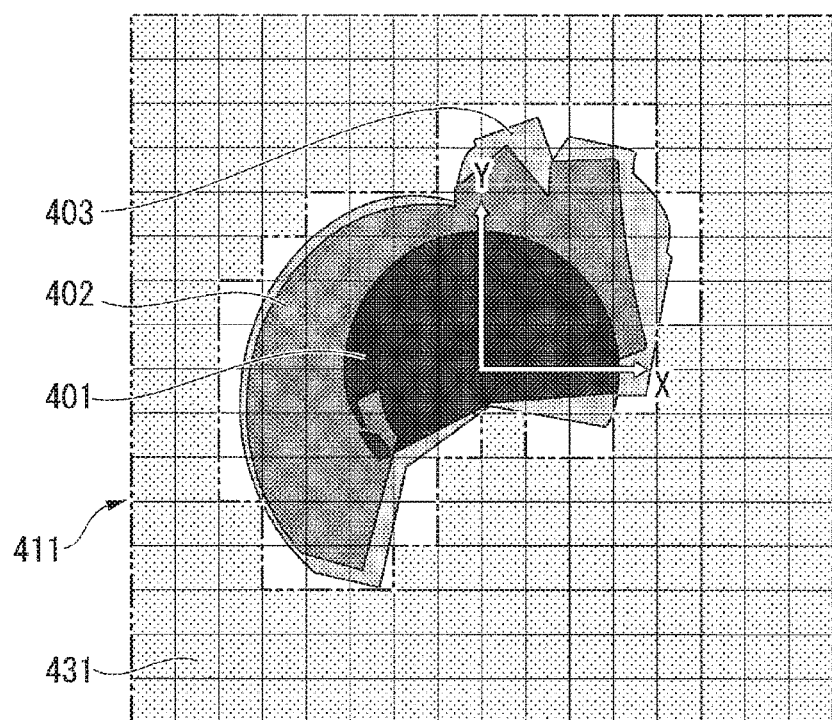
FIG. 15 shows an example of a safety region through which the modeled robot does not pass according to the one embodiment of the present disclosure.

FIG. 15 shows the example of the safety region 431 through which the modeled robot 20 does not pass according to the one embodiment of the present disclosure.

For convenience of explanation, FIG. 15 shows axes of an XYZ orthogonal coordinate system.

In the example of FIG. 15, the safety region 431 is set for the example of FIG. 14.

FIG. 15 shows the third mesh 411 and the first region 401 to third region 403 shown in FIG. 14.

Here, in the embodiment, the safety region 431 is set in units of squares formed by the third mesh 411. That is, with respect to a single square, when the regions through which the modeled robot may pass (first region 401 to third region 403) do not completely overlap with the square, the region of the square is included in the safety region 431. On the other hand, when the regions through which the modeled robot may pass (first region 401 to third region 403) partially or entirely overlap with the square, the region of the square is not included in the safety region 431.

Numerical Patterning

The control apparatus-side display control unit 51 of the robot control apparatus 30 numerically patterns the regions through which the robot 20 may pass (for convenience of explanation, also referred to as "passage region") and the safety region 431.

Figure 16:
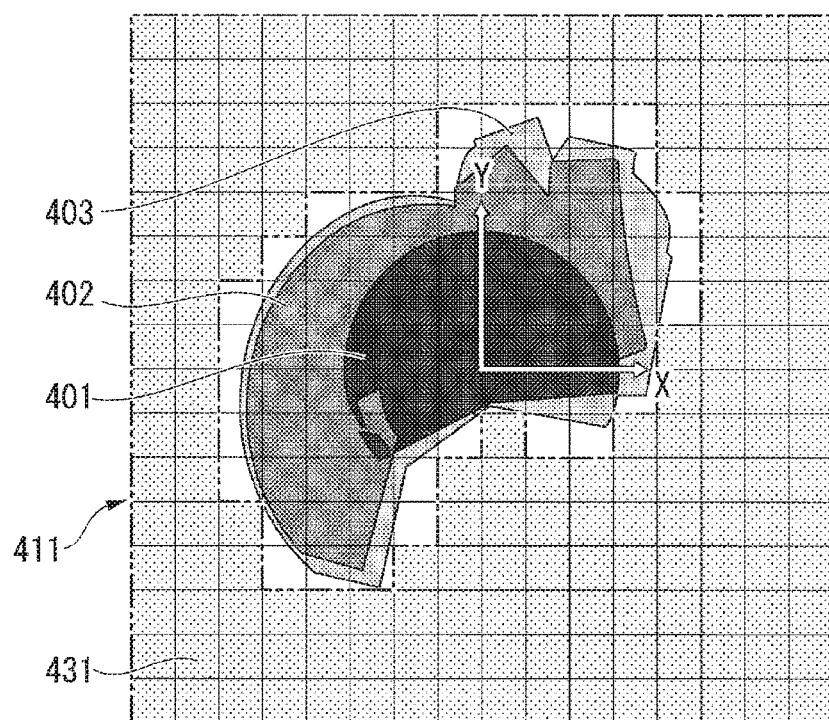
FIG. 16 shows an example of a numerical pattern of a passage region and the safety region according to the one embodiment of the present disclosure.

FIG. 16 shows the example of the numerical pattern of the passage region 432 and the safety region 431 according to the one embodiment of the present disclosure.

For convenience of explanation, FIG. 16 shows an xy orthogonal coordinate system on a plane. In this example, directions along the x-axis of the xy orthogonal coordinate system correspond to the horizontal directions and directions along the y-axis correspond to the vertical directions.

FIG. 16 shows the same third mesh 411 as that shown in FIG. 15.

Further, FIG. 16 shows the safety region 431 and the passage region 432.

Note that the safety region 431 may be an infinite region and, in the embodiment, calculation processing is performed with respect to a limited region.

With respect to the plurality of squares formed by the third mesh 411, the control apparatus-side display control unit 51 of the robot control apparatus 30 sets values of "1" for the squares included in the safety region 431, and sets values of "0" for the squares included in the passage region 432. Thereby, the safety region 431 and the passage region 432 are numerically patterned.

As described above, the control apparatus-side display control unit 51 of the robot control apparatus 30 assigns scores (values) to the respective plurality of squares formed by the third mesh 411.

Here, the values set for the squares included in the safety region 431 and the values set for the squares included in the passage region 432 may be respectively set to arbitrary values.

Detection of Edge

The control apparatus-side display control unit 51 of the robot control apparatus 30 performs processing of predetermined filtering and detects an edge using the numerical pattern shown in FIG. 16 as image information. In this case, the control apparatus-side display control unit 51 of the robot control apparatus 30 regards the respective plurality of squares formed by the third mesh 411 as single pixels and handles the squares as an image in which numerical values as pixel values are set for the respective pixels. The pixel values may be regarded as e.g. brightness values.

Here, as the predetermined filtering, arbitrary filtering for edge detection may be used, e.g. filtering using a Sobel filter or filtering using a Laplacian filter may be employed.

Figure 17:
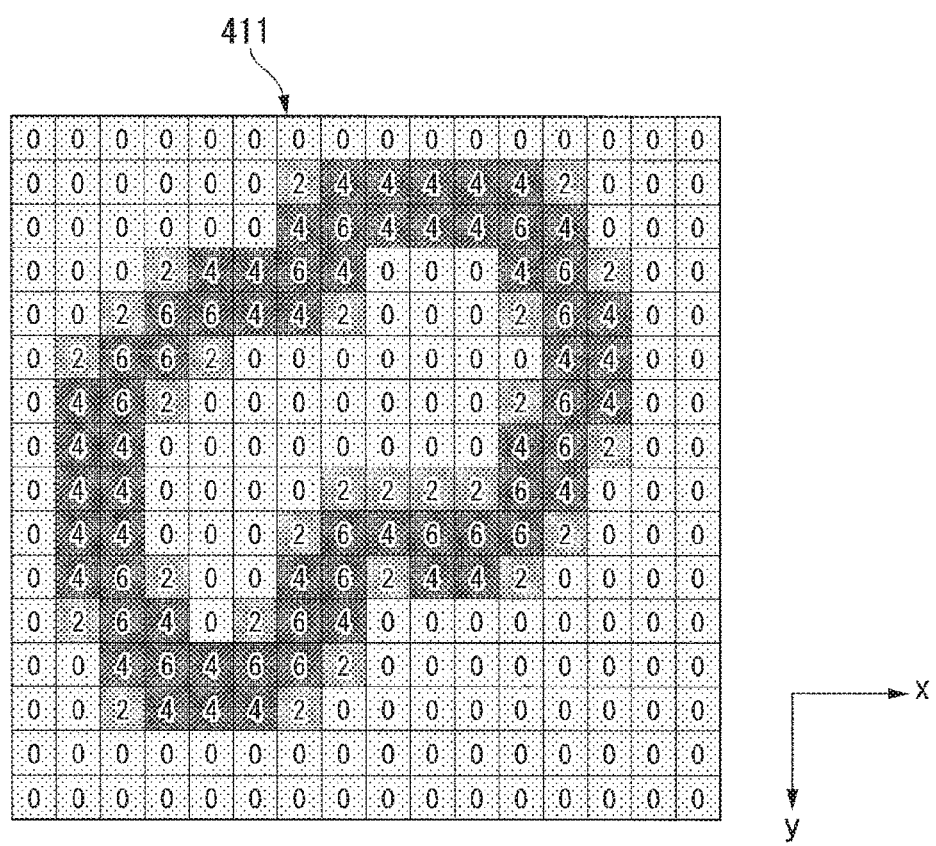
FIG. 17 shows an example of a filtering result of the numerical pattern according to the one embodiment of the present disclosure.

FIG. 17 shows the example of the filtering result of the numerical pattern according to the one embodiment of the present disclosure.

For convenience of explanation, FIG. 17 shows an xy orthogonal coordinate system on a plane like the case in FIG. 16.

FIG. 17 shows the same third mesh 411 as that shown in FIG. 16.

Numerical values as the filtering result are shown in the respective plurality of squares formed by the third mesh 411.

Here, the filtering processing in this example is explained.

According to the xy orthogonal coordinate system shown in FIG. 17, the directions in which the plurality of squares formed by the third mesh 411 are arranged are the x directions and the y directions. In the example of FIG. 17, the x directions are the horizontal directions and the y directions are the vertical directions.

When the plurality of squares arranged in the x directions are sequentially numbered, the numbers are expressed by i. Similarly, when the plurality of squares arranged in the y directions are sequentially numbered, the numbers are expressed by j.

The pixel value assigned to the square specified by i and j is expressed by $I(i,j)$.

A small component of x is expressed by $\Delta x$, a small component of y is expressed by $\Delta y$, and a small component of $I(i,j)$ is expressed by $\Delta I(i,j)$.

Expression (1) shows (gradient in x directions, gradient in y directions) with respect to the pixel value.

Expression (2) shows an entire gradient $\Delta I(i,j)$ of the pixel value.

Expression (3) shows an operator with respect to the x directions.

Expression (4) shows an operator with respect to the y directions.

$$\left( \frac{\partial I(i,j)}{\partial x}, \frac{\partial I(i,j)}{\partial y} \right) \quad (1)$$

-continued $$\Delta I(i, j) = \frac{\partial I(i, j)}{\partial x}\Delta x + \frac{\partial I(i, j)}{\partial y}\Delta y \quad (2)$$

$$\begin{pmatrix} -1 & 0 & 1 \\ -2 & 0 & 2 \\ -1 & 0 & 1 \end{pmatrix} \quad (3)$$

$$\begin{pmatrix} -1 & -2 & -1 \\ 0 & 0 & 0 \\ 1 & 2 & 1 \end{pmatrix} \quad (4)$$

The control apparatus-side display control unit 51 of the robot control apparatus 30 calculates (gradient in x directions, gradient in y directions) shown in Expression (1).

Then, the control apparatus-side display control unit 51 calculates the entire gradient $\Delta I(i,j)$ of the pixel value shown in Expression (2).

In this case, the control apparatus-side display control unit 51 derives the gradient in the x directions by calculation of multiplying a matrix of pixel values of a pixel of interest and the surrounding pixels by the operator in the x directions shown in Expression (3). Here, the matrix and the operator have the same number of pixels (number of squares) in the x directions and the same number of pixels (number of squares) in the y directions. Further, the pixel (square) at the center of the matrix is the pixel (square) of interest.

Similarly, the control apparatus-side display control unit 51 derives the gradient in the y directions by calculation of multiplying a matrix of pixel values of a pixel of interest and the surrounding pixels by the operator in the y directions shown in Expression (4). Here, the matrix and the operator have the same number of pixels (number of squares) in the x directions and the same number of pixels (number of squares) in the y directions. Further, the pixel (square) at the center of the matrix is the pixel (square) of interest.

Here, the matrix of pixel values of the pixel of interest and the surrounding pixels are common in the calculation in the x directions and the calculation in the y directions.

Further, in this example, as the calculation of multiplying the matrix by the operator, multiplication of the values of the matrix by the values of the operator with respect to each pixel (square) and summation of the multiplication results with respect to all pixels (squares) are performed.

As a specific example, when 3×3 matrix and operator are taken as an example, and the matrix has {first row (1,1,0), second row (1,1,1), third row (1,1,1)} and the operator has {first row (−1,0,1), second row (−2,0,2), third row (−1,0,1)}, a calculation result of these is "−1" (=1×−1+1×0+0×1+1×−2+1×0+1×2+1×−1+1×0+1×1).

Note that the positive and negative signs of the pixel values may be appropriately adjusted to be inverted.

Binarization of Edge

Next, the control apparatus-side display control unit 51 of the robot control apparatus 30 binarizes the detected numerical pattern of the edge.

In this example, the control apparatus-side display control unit 51 performs binarization using a predetermined threshold value. Specifically, regarding the pixel values of the respective pixels (squares) in the filtering result, the control apparatus-side display control unit 51 assigns a value of "1" when the pixel value is equal to or larger than the predetermined threshold value, and assigns a value of "0" when the pixel value is smaller than the predetermined threshold value. Note that other arbitrary values may be used for the values to be assigned. Further, an arbitrary value may be used for the threshold value.

Figure 18:
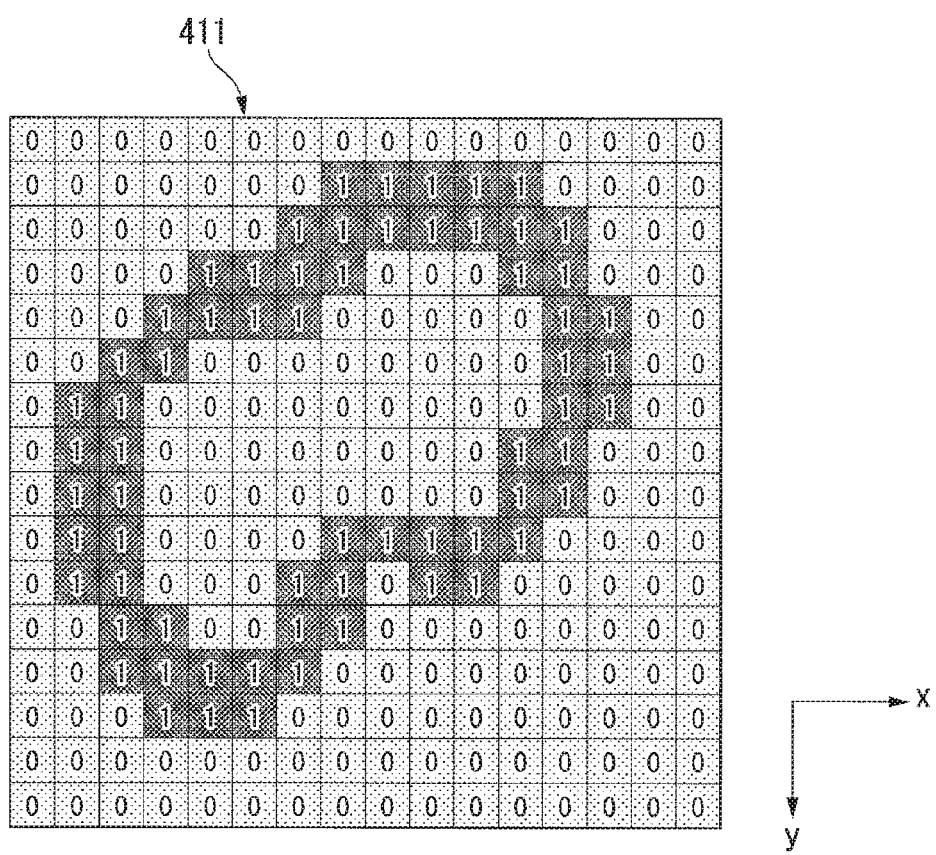
FIG. 18 shows an example of binarization of the filtering result according to the one embodiment of the present disclosure.

FIG. 18 shows the example of binarization of the filtering result according to the one embodiment of the present disclosure.

For convenience of explanation, FIG. 18 shows an xy orthogonal coordinate system on a plane as is the cases of FIGS. 16 and 17.

The example in FIG. 18 is the example of the result obtained by binarization processing on the example in FIG. 17.

In this example, e.g. "3" or "4" is used as the threshold value for binarization.

Then, in the binarization result with respect to the edge, the control apparatus-side display control unit 51 of the robot control apparatus 30 overwrites the pixel value of the pixel (square) overlapping with the passage region 432 of the robot 20 with the value of "0" not the edge. That is, if the pixel (square) in the passage region 432 is a candidate for the boundary od the edge in the binarization result, the pixel is removed from candidates of the boundary of the edge.

Figure 19:
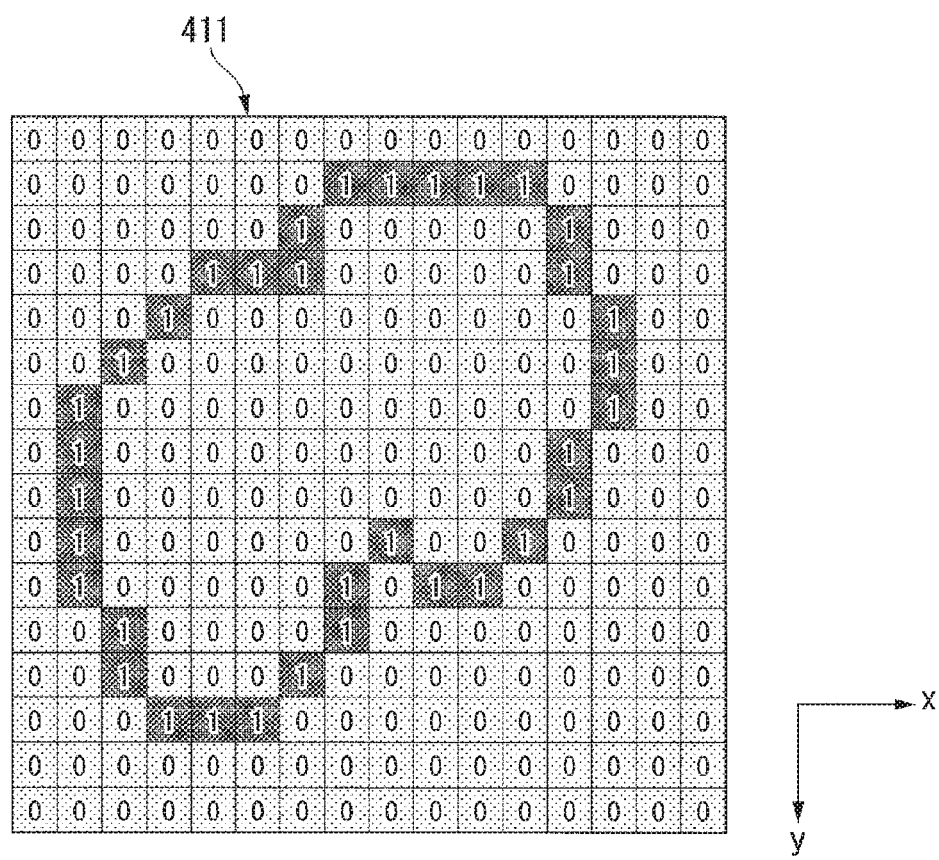
FIG. 19 shows an example of a boundary of the safety region according to the one embodiment of the present disclosure.

FIG. 19 shows the example of the boundary of the safety region 431 according to the one embodiment of the present disclosure.

For convenience of explanation, FIG. 19 shows an xy orthogonal coordinate system on a plane as is the cases of FIGS. 16 to 18.

In the example of FIG. 19, of the pixels (squares) of the candidates for the boundary of the edge shown in FIG. 18, the part except the pixels (squares) included in the passage region 432 shown in FIG. 16 is the final boundary of the safety region 431.

For example, the control apparatus-side display control unit 51 of the robot control apparatus 30 provides a virtual wall corresponding to the final boundary of the safety region 431.

Here, for example, with respect to the obtained final boundary of the safety region 431, the control apparatus-side display control unit 51 may provide a virtual wall at the boundary or provide a virtual wall outside of the boundary.

Or, for example, the control apparatus-side display control unit 51 may provide a margin with respect to the calculated boundary and provide a virtual wall in a part corresponding to the margin.

Or, for example, the control apparatus-side display control unit 51 may create and provide a plurality of virtual walls having different margins based on the final boundary of the safety region 431.

As the plurality of virtual walls having different margins, e.g. virtual walls that partition a virtual region for slowing the action of the robot 20 or virtual walls that partition a virtual region for stopping the action of the robot 20 may be used.

Further, for example, scaling may be performed on one or more virtual walls as reference and a similarly shape may be created by enlargement or reduction relative to the shape surrounded by the virtual walls, and thereby, the plurality of virtual walls having different margins may be acquired.

Here, as a method of creating the virtual walls according to the boundary of the safety region 431, an arbitrary method may be used. For example, a method of creating a convex hull from the boundary of the safety region 431 or the like and generating the convex hull as data of CAD or the like may be used.

Note that, for example, the surfaces of the respective virtual walls may be perpendicular to the xy plane or inclined relative to the perpendicular.

The control apparatus-side display control unit displays the created virtual wall as the simulation result or the like.

Other Methods of Creating Boundary of Safety Region

Figure 20:
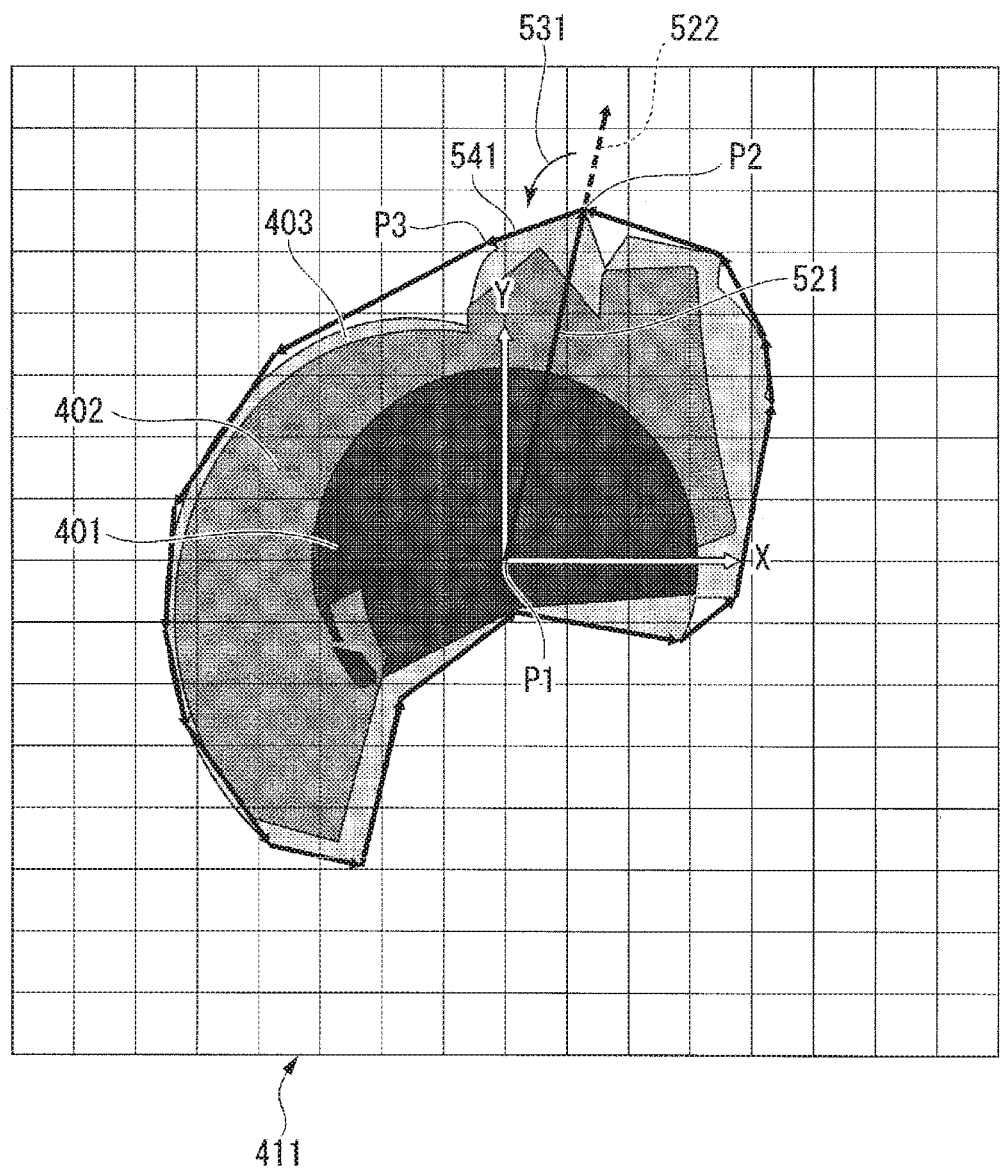
FIG. 20 shows another example of creation of the boundary of the safety region according to the one embodiment of the present disclosure.
Figure 21:
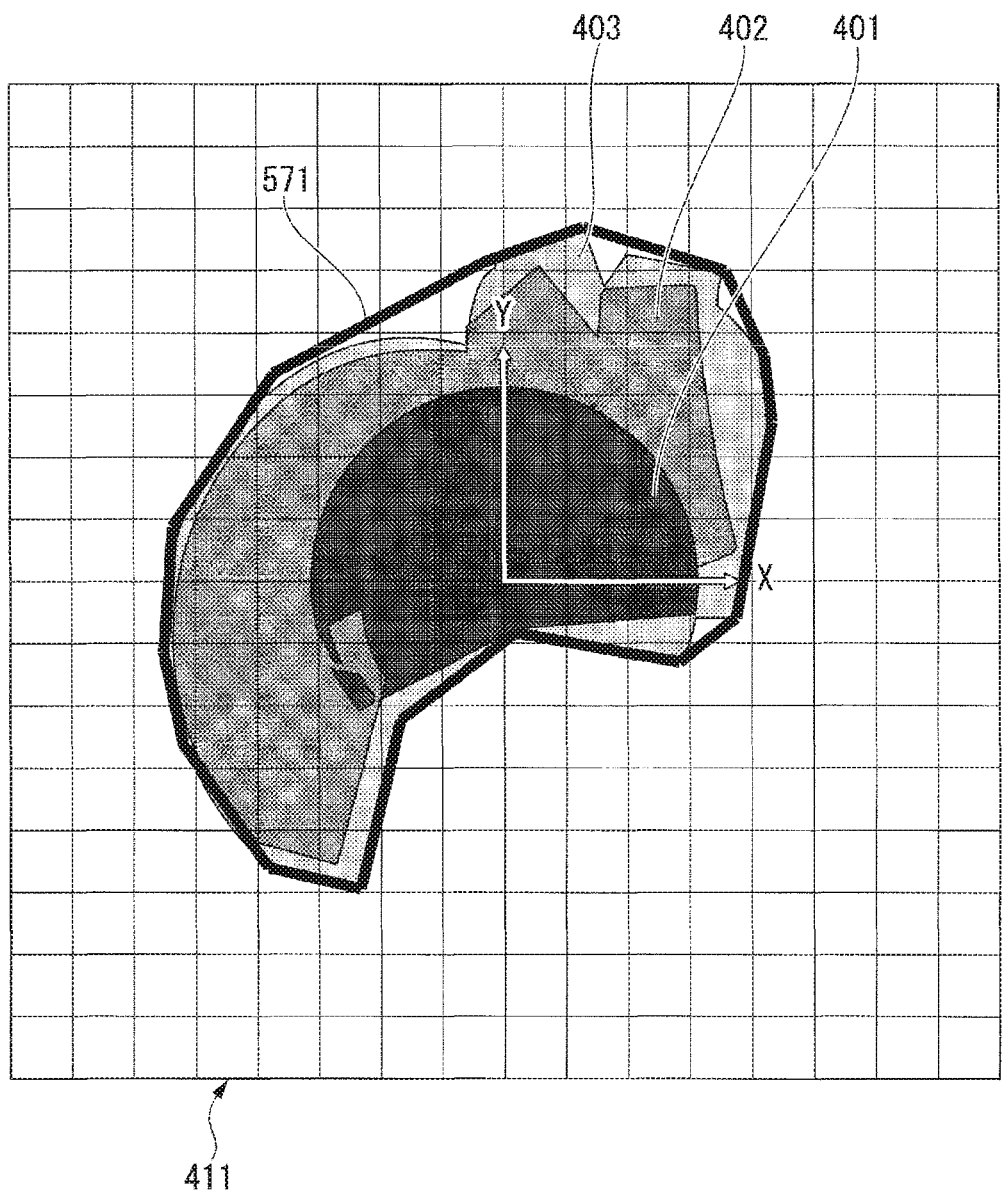
FIG. 21 shows another example of creation of the boundary of the safety region according to the one embodiment of the present disclosure.

Referring to FIGS. 20 and 21, another method of creating the boundary of the safety region will be explained.

FIGS. 20 and 21 shows the other example of creation of the boundary of the safety region according to the one embodiment of the present disclosure.

In the example of FIGS. 20 and 21, a different method from the method of creating the boundary of the safety region shown in the example of FIGS. 15 to 19 will be explained.

In this method, processing is performed on an xy plane when the robot 20 etc. are seen in the upward and downward directions.

For convenience of explanation, FIGS. 20 and 21 each show axes of an XYZ orthogonal coordinate system.

FIGS. 20 and 21 each show the same third mesh 411 and three regions (first region 401 to third region 403) as those shown in FIG. 14.

As shown in FIG. 20, the control apparatus-side display control unit 51 of the robot control apparatus 30 detects a position P2 in an operation region farthest from a position P1 of the origin of the robot 20 by searching. Then, the control apparatus-side display control unit 51 extends and contracts a vector from the origin position P1 to the position P2 (for convenience of explanation, referred to as "first vector 521") and rotates a partial vector with reference to the detected position P2, and thereby, for example, the norm of the vector may be increased as large as possible and a position P3 in the operation region near the position P2 is detected by searching.

Here, the respective positions may be specified using e.g. coordinate values.

Further, as the position P1 of the origin of the robot 20, e.g. the position of the center of gravity of the base B of the robot 20 or the like may be used.

In this example, the operation region of the robot is a region surrounded by an outer frame formed by superimposition of the three regions (first region 401 to third region 403). That is, in this example, a position included in at least one region of the three regions (first region 401 to third region 403) is a position in the operation region of the robot 20.

Specifically, the control apparatus-side display control unit 51, for example, extends the first vector 521 from the origin position P1 to the position P2 in a direction away from the origin position P1, rotates the extended vector (for convenience of explanation, referred to as "second vector 522") around the position P2 in a predetermined rotation direction 531, and detects the position P3 of the point at which the second vector 522 contacts the outer periphery of the three regions (first region 401 to third region 403). Thereby, a line segment of a vector from the position P2 to the position P3 (for convenience of explanation, referred to as "third vector 541") is specified as the boundary of the safety region.

Subsequently, the control apparatus-side display control unit 51 performs the same processing on the position P3 in place of the position P2.

The control apparatus-side display control unit 51 repeatedly performs the above described procedure of the processing until the entire of the operation region is fully covered around by the boundary of the safety region. In this regard, when the position sequentially detected after the position P3 is returned to the initial position P2, the repeated processing ends.

Then, the control apparatus-side display control unit 51 couples the line segments of all vectors (the third vector 541 etc.) specified as vectors corresponding to the boundary of the safety region in the algorithm, and specifies a collection of the coupled line segments as the boundary of the safety region.

FIG. 21 shows an example of a boundary 571 of the safety region. The boundary 571 of the safety region is a line fully covering the outer periphery of the operation region of the robot 20 or nearby around and surrounding the operation region.

In this manner, the control apparatus-side display control unit 51 creates the boundary 571 of the safety region.

FIG. 22 shows the example of the virtual wall (for convenience of explanation, referred to as "fifth virtual wall 601") according to the one embodiment of the present disclosure. Note that, in the example of FIG. 22, the robot 20 etc. are simplified.

FIG. 22 shows axes of an XYZ orthogonal coordinate system for convenience of explanation.

FIG. 22 shows the robot 20 and the fifth virtual wall 601 surrounding the operation region of the robot 20.

Note that, for example, each surface of the fifth virtual wall 601 may be perpendicular to the xy plane or inclined relative to the perpendicular.

The control apparatus-side display control unit displays the created fifth virtual wall 601 as a simulation result or the like.

Creation of Virtual Wall According to Trajectory in Actions of Robot

For example, the control apparatus-side display control unit 51 of the robot control apparatus 30 may set a fixed virtual wall from the start to the end of a series of actions performed by the robot 20. As another example, the virtual wall may be changed in the middle of the series of actions performed by the robot 20.

For example, the control apparatus-side display control unit 51 may create the virtual wall according to the trajectory in the actions of the robot 20 and change the virtual wall according to the trajectory in the actions of the robot 20.

Specifically, in the example of FIG. 8, it is assumed that the region in which the trajectories of the robot 20 by the actions of the robot 20 in (Processing D1) to (Processing D3) exists is converged within a smaller range and the region in which the trajectories of the robot 20 by the actions of the robot 20 in (Processing D4) and (Processing D5) exists is converged within a smaller range, however, these two regions have main work positions in different locations.

In this case, the control apparatus-side display control unit 51 may create different virtual walls with respect to the regions. That is, the control apparatus-side display control unit 51 may make the virtual wall applied to the robot 20 in (Processing D1) to (Processing D3) and the virtual wall applied to the robot 20 in (Processing D4) and (Processing D5) different. Then, the control apparatus-side display control unit 51 may change the virtual walls for use so that an appropriate virtual wall is set in (Processing D1) to (Processing D3) and an appropriate virtual wall is set in (Processing D4) and (Processing D5).

As described above, compared to the case where the same virtual wall is used in all of the series of actions performed by the robot 20, the case where the respective different virtual walls are used for respective action groups having the same or two or more similar trajectories may be more effective. Here, the action group may include two or more actions or only a single action. Further, the partitions of the respective actions may be arbitrarily set by the user or the like.

Here, the explanation is made by the expression that the virtual walls may be different for the actions, however, for example, an expression that the virtual walls may be different for works or an expression that the virtual walls may be different for trajectories may be used.

Creation of Virtual Wall

In the robot system 1 according to the embodiment, in the robot control apparatus 30 or the like, a virtual wall according to a virtual region for entrance sensing or the like may be automatically set based on a result of execution of actions of the robot 20 taught by the worker H by a simulation. Accordingly, in the robot control apparatus 30 or the like, for example, the path of the action of the robot 20 in the simulation is changed, and thereby, the virtual wall may be changed to a virtual wall suitable for the changed path.

Here, in the robot system 1 according to the embodiment, in the simulation used for automatically setting of the virtual wall, for example, not only the position information of the distal end portion of the robot 20 but also position information and posture information of the entire robot 20 can be used. The position information and posture information of the entire robot 20 are calculated based on angle information of the respective joint axes of the robot 20 at the respective times and the model of the robot 20 obtained when the simulation is executed.

Further, in the robot system 1 according to the embodiment, in the robot control apparatus 30 or the like, with respect to the angle information of the respective joint axes of the robot 20, not only angles at the respective times necessary for achievement of the simulation but also free running angles as amounts of angles required for additional movement until the robot 20 completely stops when emergency stop commands are issued at the respective times are simultaneously recorded. Thereby, in the robot control apparatus 30 or the like, for example, the virtual wall in consideration of the case where an emergency stop command is issued for false operation of the robot 20 is set.

As described above, in the robot system 1 according to the embodiment, for example, when the user including the worker H determines the action of the robot 20, the virtual wall is automatically set, and thereby, it is unnecessary for the user to think the way of setting of the virtual wall and shortening of the time taken for the configuration of the robot system 1 is expected.

Further, in the robot system 1 according to the embodiment, for example, virtual regions in two stages can be set and virtual regions in three or more stages can be set. Thereby, in the robot system 1 according to the embodiment, for example, configurations may be made different by slowing of the actions of the robot 20 when the worker H or the like enters the virtual regions in the respective stages.

Here, in the robot system 1 according to the embodiment, the virtual regions in the plurality of stages can be easily created by e.g. scaling of a virtual region as a reference.

In the robot system 1 according to the embodiment, when virtual walls in a plurality of stages are set, for example, different display forms may be used for the virtual walls in the respective stages. As another example, when virtual regions in a plurality of stages are set, the same display form may be used for the virtual walls in all stages.

In the robot system 1 according to the embodiment, for example, a sensor such as an area sensor that can detect a position of a human or object as a position of an obstacle is provided in the real space, and thereby, whether or not the object enters the virtual region may be detected and the action of the robot 20 can be slowed or the action can be stopped. The configuration is expected to application to the collaborative robot field.

Further, in the robot system 1 according to the embodiment, for example, the user can check the virtual region or virtual wall on the screen displaying the virtual reality space as a simulation result, and additionally, when wearing a head mounted display, the user can easily check the virtual region or virtual wall in relation to the robot 20 or the like existing in the real space.

Here, as a comparative example, a configuration in which two virtual regions are set in the virtual reality space and, when the distal end portion of the robot enters one virtual region, the action velocity of the robot is restricted and, when the distal end portion of the robot enters the other virtual region set inside of the one virtual region, the action of the robot is stopped or the robot is brought out of the other virtual region is considered. Further, a configuration in which, in a simulation result of the action of the robot, the two virtual regions are displayed to the worker and the respective virtual regions can be set in arbitrary positions by the worker is considered.

However, in the comparative example, it is necessary for the worker to view the simulation result of the action of the robot and think a position in which the virtual region should be set by the worker himself or herself. Further, in the comparative example, a result relating to only the distal end portion of the robot is displayed as the simulation result of the action of the robot, and thus, it may be difficult to set the virtual region in consideration of the position of the entire robot including the distal end portion unless the worker has knowledge of the robot.

As described above, when the worker manually sets the virtual wall based on the risk assessment, it is necessary for the worker to have a lot of knowledge of the action of the robot, however, in the embodiment, the virtual wall suitable for the action of the robot 20 may be set by the robot control apparatus 30 or display apparatus 40 unless a lot of knowledge is required for the user including the worker H.

Overview of Embodiment

As described above, in the robot system 1 according to the embodiment, in the robot control apparatus (in the embodiment, an example of a control apparatus) that controls the robot 20 having the movable unit A, the control apparatus-side display control unit 51 (in the embodiment, an example of a display control unit) that changes the display form of the virtual wall displayed on the display unit 46 transmitting visible light based on the distance between the virtual wall on the real space and the movable unit A and the velocity of the movable unit A is provided.

Therefore, in the robot system 1 according to the embodiment, in the robot control apparatus 30, display of the virtual wall in the suitable display form on the display unit 46 may be realized based on the distance between the virtual wall on the real space and the movable unit A and the velocity of the movable unit A. Thereby, in the robot system 1 according to the embodiment, for example, for the worker H viewing the display of the display unit 46 or the like, the virtual wall may be displayed in the effective display form and the current status of the robot 20 can be easily grasped.

In the robot system 1 according to the embodiment, in the robot control apparatus 30, for example, the control apparatus-side display control unit 51 changes the display form of the virtual wall based on the distance between the worker H wearing the display unit 46 and the virtual wall.

Therefore, in the robot system 1 according to the embodiment, display of the virtual wall in the suitable display form on the display unit 46 may be realized based on the distance between the virtual wall on the real space and the worker H. Thereby, in the robot system 1 according to the embodiment, for example, for the worker H viewing the display of the display unit 46 or the like, the virtual wall may be displayed in the effective display form.

Note that implementation of the above described configuration is not necessarily required.

In the robot system 1 according to the embodiment, for example, the type of the display form of the virtual wall changed based on the distance between the virtual wall and the movable unit A is different from the type of the display form of the virtual wall changed based on the distance between the worker H and the virtual wall.

Therefore, in the robot system 1 according to the embodiment, for example, the type of the display form of the virtual wall changed based on the distance between the virtual wall and the movable unit A and the type of the display form of the virtual wall changed based on the distance between the worker H and the virtual wall are different, and thus, the suitable type of the display form may be changed according to the respective distances.

Note that implementation of the above described configuration is not necessarily required.

In the robot system 1 according to the embodiment, in the robot control apparatus 30, for example, the control apparatus-side display control unit 51 changes the display form of the virtual wall based on the distance between the worker H and the virtual wall and the predetermined value (in the embodiment, the value of the reach of the arm of the worker H).

Therefore, in the robot system 1 according to the embodiment, for example, display of the virtual wall in the suitable display form on the display unit 46 may be realized in consideration of the value of the reach of the arm of the worker H.

Note that implementation of the above described configuration is not necessarily required.

In the robot system 1 according to the embodiment, in the robot control apparatus 30, for example, the control apparatus-side display control unit 51 changes the display form of the virtual wall based on the distance between the virtual wall and the position after a lapse of a predetermined time from the current position of the movable unit A.

Therefore, in the robot system 1 according to the embodiment, for example, display of the virtual wall in the suitable display form on the display unit 46 may be realized based on the position of the movable unit A in the future.

Note that implementation of the above described configuration is not necessarily required.

In the robot system 1 according to the embodiment, in the robot control apparatus 30, for example, the control apparatus-side display control unit 51 displays the virtual wall based on the trajectory in the action of the movable unit A.

Therefore, in the robot system 1 according to the embodiment, for example, display of the virtual wall in the suitable display form on the display unit 46 may be realized based on the trajectory in the action of the movable unit A.

Note that implementation of the above described configuration is not necessarily required.

In the robot system 1 according to the embodiment, for example, the action includes the first action and the second action executed after the first action and being different from the first action and, in the robot control apparatus 30, when the movable unit A changes from the first action to the second action, the control apparatus-side display control unit 51 changes the virtual wall according to the trajectory of the movable unit A in the first action to the virtual wall according to the trajectory of the movable unit A in the second action.

Therefore, in the robot system 1 according to the embodiment, for example, display of the suitable virtual walls on the display unit 46 may be realized according to the trajectories of the movable unit A in the respective actions.

Note that implementation of the above described configuration is not necessarily required.

In the robot system 1 according to the embodiment, in the robot control apparatus 30, for example, the control apparatus-side display control unit 51 displays the virtual wall according to the trajectory of the movable unit A in the selected action of the actions.

Therefore, in the robot system 1 according to the embodiment, for example, display of the suitable virtual wall on the display unit 46 may be realized according to the trajectory of the movable unit A in the selected action.

Note that implementation of the above described configuration is not necessarily required.

In the robot system 1 according to the embodiment, for example, a receiving unit (in the embodiment, the user interface) receiving the command to display the region having the similarity shape to the region surrounded by the virtual wall from the user is provided and, in the robot control apparatus 30, the control apparatus-side display control unit 51 displays the region having the similarity shape based on the command received by the receiving unit.

Therefore, in the robot system 1 according to the embodiment, for example, scaling of the region surrounded by the virtual wall can be performed based on the command received from the user and scaling of the virtual wall can be performed.

Note that implementation of the above described configuration is not necessarily required.

In the robot system 1 according to the embodiment, for example, in the head mounted display (in the embodiment, an example of the display apparatus 40), the display unit that displays the virtual wall and transmitting the visible light, and the display apparatus-side display control unit 61 (in the embodiment, an example of the display control unit) that changes the display form of the virtual wall displayed on the display unit 46 based on the distance between the movable unit A of the robot 20 and the virtual wall on the real space and the velocity of the movable unit A are provided.

Therefore, in the robot system 1 according to the embodiment, in the head mounted display, display of the virtual wall in the suitable display form on the display unit 46 may be realized based on the distance between the virtual wall on the real space and the movable unit A and the velocity of the movable unit A. Thereby, in the robot system 1 according to the embodiment, for example, for the worker H viewing the display of the display unit 46 or the like, the virtual wall may be displayed in the effective display form and the current status of the robot 20 can be easily grasped.

In the robot system 1 according to the embodiment, in the head mounted display, for example, the display apparatus-side display control unit 61 changes the display form of the virtual wall based on the distance between the worker H wearing the display unit 46 and the virtual wall.

Therefore, in the robot system 1 according to the embodiment, in the head mounted display, display of the virtual wall in the suitable display form on the display unit 46 may be realized based on the distance between the virtual wall on the real space and the worker H. Thereby, in the robot system 1 according to the embodiment, for example, for the worker H viewing the display of the display unit 46 or the like, the virtual wall may be displayed in the effective display form.

Note that implementation of the above described configuration is not necessarily required.

In the robot system 1 according to the embodiment, for example, the type of the display form of the virtual wall changed based on the distance between the virtual wall and the movable unit A is different from the type of the display form of the virtual wall changed based on the distance between the worker H and the virtual wall.

Therefore, in the robot system 1 according to the embodiment, for example, the type of the display form of the virtual wall changed based on the distance between the virtual wall and the movable unit A and the type of the display form of the virtual wall changed based on the distance between the worker H and the virtual wall are different, and thus, the suitable types of the display form may be changed according to the respective distances.

Note that implementation of the above described configuration is not necessarily required.

In the robot system 1 according to the embodiment, in the head mounted display, for example, the display apparatus-side display control unit 61 changes the display form of the virtual wall based on the distance between the worker H and the virtual wall and the predetermined value (in the embodiment, the value of the reach of the arm of the worker H).

Therefore, in the robot system 1 according to the embodiment, in the head mounted display, for example, display of the virtual wall in the suitable display form on the display unit 46 may be realized in consideration of the value of the reach of the arm of the worker H.

Note that implementation of the above described configuration is not necessarily required.

In the robot system 1 according to the embodiment, in the head mounted display, for example, the display apparatus-side display control unit 61 changes the display form of the virtual wall based on the distance between the virtual wall and the position after a lapse of a predetermined time from the current position of the movable unit A.

Therefore, in the robot system 1 according to the embodiment, in the head mounted display, for example, display of the virtual wall in the suitable display form on the display unit 46 may be realized based on the position of the movable unit A in the future.

Note that implementation of the above described configuration is not necessarily required.

In the robot system 1 according to the embodiment, in the head mounted display, for example, the display apparatus-side display control unit 61 displays the virtual wall based on the trajectory in the action of the movable unit A.

Therefore, in the robot system 1 according to the embodiment, in the head mounted display, for example, display of the suitable virtual wall on the display unit 46 may be realized based on the trajectory in the action of the movable unit A.

Note that implementation of the above described configuration is not necessarily required.

In the robot system 1 according to the embodiment, for example, the action includes the first action and the second action executed after the first action and being different from the first action and, in the head mounted display, when the movable unit A changes from the first action to the second action, the display apparatus-side display control unit 61 changes the virtual wall according to the trajectory of the movable unit A in the first action to the virtual wall according to the trajectory of the movable unit A in the second action.

Therefore, in the robot system 1 according to the embodiment, in the head mounted display, for example, display of the suitable virtual walls on the display unit 46 may be realized according to the trajectories of the movable unit A in the respective actions.

Note that implementation of the above described configuration is not necessarily required.

In the robot system 1 according to the embodiment, in the head mounted display, for example, the display apparatus-side display control unit 61 displays the virtual wall according to the trajectory of the movable unit A in the selected action of the actions.

Therefore, in the robot system 1 according to the embodiment, in the head mounted display, for example, display of the suitable virtual wall on the display unit 46 may be realized according to the trajectory of the movable unit A in the selected action.

Note that implementation of the above described configuration is not necessarily required.

In the robot system 1 according to the embodiment, for example, a receiving unit (in the embodiment, the user interface) receiving the command to display the region having the similarity shape to the region surrounded by the virtual wall from the user is provided and the display apparatus-side display control unit 61 displays the region having the similarity shape based on the command received by the receiving unit.

Therefore, in the robot system 1 according to the embodiment, for example, scaling of the region surrounded by the virtual wall can be performed based on the command received from the user and scaling of the virtual wall can be performed.

Note that implementation of the above described configuration is not necessarily required.

In the robot system 1 according to the embodiment, the robot 20 having the movable unit A, the head mounted display (in the embodiment, an example of the display apparatus 40) having the display unit 46 that transmits visible light and displaying the virtual wall on the display unit 46, and the display control unit (in the embodiment, the control apparatus-side display control unit 51 or the display apparatus-side display control unit 61) that changes the display form of the virtual wall displayed on the display unit 46 based on the distance between the virtual wall on the real space and the movable unit A and the velocity of the movable unit A are provided.

Therefore, in the robot system 1 according to the embodiment, display of the virtual wall in the suitable display form on the display unit 46 may be realized based on the distance between the virtual wall on the real space and the movable unit A and the velocity of the movable unit A. Thereby, in the robot system 1 according to the embodiment, for example, for the worker H viewing the display of the display unit 46 or the like, the virtual wall may be displayed in the effective display form and the current status of the robot 20 can be easily grasped.

Programs for realizing functions of arbitrary configuration units in the above described apparatuses (e.g. the position detection apparatus 25, the robot control apparatus 30, the display apparatus 40, etc.) may be recorded (stored) in a computer-readable recording medium (storage medium) and the programs may be read and executed by a computer system. Note that "computer system" here includes an operating system (OS) or hardware such as a peripheral device. Further, "computer-readable recording medium" refers to a storage device such as a portable medium such as a flexible disc, magnetooptical hard disc, ROM, CD (Compact Disc)-ROM, a hard disc built in the computer system, or the like. Furthermore, "computer-readable recording medium" includes a device that holds the program in a certain time such as a server when the program is transmitted via a network including the Internet or a communication line such as a phone line or a volatile memory (ROM) within the computer system as a client.

The above described program may be transmitted from the computer system in which the program is stored in the storage device or the like to another computer system via a transmission medium or transmission wave in the transmission medium. Here, "transmission medium" that transmits the program refers to a medium having a function of transmitting information like a network (communication network) including the Internet or a communication line such as a phone line.

The above described program may be a program for realization of a part of the above described function. Further, the above described program may be a program that may realize the above described function by a combination with a program that has been already recorded in the computer system, the so-called differential file (differential program).

As above, the embodiments of the present disclosure are described in detail with reference to the drawings. The specific configurations are not limited to the embodiments, but include designs without departing from the scope of the present disclosure etc.

For instance, in the embodiment, the scalar robot (horizontal articulated robot) is explained as an example, however, as another example, techniques according to all or part of the embodiment may be applied to a vertical articulated robot including the so-called six-axis robot or seven-axis robot or another robot.

What is claimed is:

1. A control apparatus that controls a robot having a movable unit, the control apparatus comprising:
   a memory configured to store a program; and
   a processor configured to execute the program so as to:
      detect a worker position of a worker in a work space by using an area sensor;
      detect an arm of the worker based on a captured image of the worker by a camera and determine a length of the arm of the worker by analyzing the captured image of the worker;
      detect a robot position of the robot;
      detect a robot posture of the robot;
      calculate a movable area of the movable unit of the robot;
      determine no-collision distances from the robot to a surrounding area in the work space based on the worker position, the robot position, and the calculated movable area of the movable unit of the robot;
      adjust the no-collision distances by adding the determined length of the arm of the worker in consideration of a distance between the robot position and a tip of a finger of the worker when the worker stretches the arm toward the robot and generate adjusted no-collision distances;
      calculate a position of a virtual wall surrounding the robot based on the adjusted no-collision distances;
      display the virtual wall on a see-through display attached to the worker; and
      change the position of the virtual wall displayed on the see-through display according to changes of the worker position.

2. The control apparatus according to claim 1, wherein the processor is configured to change a display form of the virtual wall based on a distance between the worker position and the virtual wall.

3. The control apparatus according to claim 2, wherein a type of the display form of the virtual wall changed based on a distance between the virtual wall and the movable unit is different from a type of the display form of the virtual wall changed based on the distance between the worker position and the virtual wall.

4. The control apparatus according to claim 2, wherein the processor is configured to change the display form of the virtual wall based on a predetermined value and the distance between the worker position and the virtual wall.

5. The control apparatus according to claim 1, wherein the processor is configured to calculate a distance between the virtual wall and a future position of the movable unit of the robot at which the movable unit is located after a period of time passes from a current time, and
the processor is configured to change a display form of the virtual wall at the current time based on the calculated distance between the virtual wall and the future position of the movable unit of the robot.

6. The control apparatus according to claim 1, wherein the processor is configured to calculate the movable area of the movable unit of the robot based on a trajectory in an action of the movable unit.

7. The control apparatus according to claim 6, wherein the action includes a first action and a second action, and the second action is executed after the first action and is different from the first action, and
the processor is configured to change the virtual wall according to a trajectory of the movable unit in the first action to the virtual wall according to a trajectory of the movable unit in the second action when the movable unit changes from the first action to the second action.

8. The control apparatus according to claim 6, wherein the action of the movable unit includes a plurality of the actions, and
the processor is configured to display the virtual wall corresponding to a trajectory of the movable unit in a selected action of the plurality of the actions.

9. A head mounted display comprising:
a see-through display configured to display a virtual wall and transmits visible light;
a memory configured to store a program; and
a processor configured to execute the program so as to:
   detect a worker position of a worker in a work space by using an area sensor;
   detect arm of the worker based on a captured image of the worker by a camera and determine a length of the arm of the worker by analyzing the captured image of the worker;
   detect a robot position of a robot;
   detect a robot posture of the robot;
   calculate a movable area of a movable unit of the robot;
   determine no-collision distances from the robot to a surrounding area in the work space based on the worker position, the robot position, and the calculated movable area of the movable unit of the robot;

adjust the no-collision distances by adding the determined length of the arm of the worker in consideration of a distance between the robot position and a tip of a finger of the worker when the worker stretches the arm toward the robot and generate adjusted no-collision distances;
calculate a position of the virtual wall surrounding the robot based on the adjusted no-collision distances;
display the virtual wall on the see-through display attached to the worker; and
change the position of the virtual wall displayed on the see-through display according to changes of the worker position.

10. The head mounted display according to claim 9, wherein the processor is configured to change a display form of the virtual wall based on a distance between the worker position and the virtual wall.

11. The head mounted display according to claim 10, wherein a type of the display form of the virtual wall changed based on a distance between the virtual wall and the movable unit is different from a type of the display form of the virtual wall changed based on the distance between the worker position and the virtual wall.

12. The head mounted display according to claim 10, wherein the processor is configured to change the display form of the virtual wall based on a predetermined value and the distance between the worker position and the virtual wall.

13. The head mounted display according to claim 9, wherein the processor is configured to calculate a distance between the virtual wall and a future position of the movable unit of the robot at which the movable unit is located after a period of time passes from a current time, and
the processor is configured to change a display form of the virtual wall at the current time based on the calculated distance between the virtual wall and the future position of the movable unit of the robot.

14. The head mounted display according to claim 9, wherein the processor is configured to calculate the movable area of the movable unit of the robot based on a trajectory in an action of the movable unit.

15. The head mounted display according to claim 14, wherein the action includes a first action and a second action, and the second action is executed after the first action and is different from the first action, and
the processor is configured to change the virtual wall according to a trajectory of the movable unit in the first action to the virtual wall according to a trajectory of the movable unit in the second action when the movable unit changes from the first action to the second action.

16. The head mounted display according to claim 14, wherein the action of the movable unit includes a plurality of the actions, and
the processor is configured to display the virtual wall corresponding to a trajectory of the movable unit in a selected action of the plurality of the actions.

17. A robot system comprising:
a robot having a movable unit;
a head mounted display unit having a see-through display that transmits visible light and displaying a virtual wall on the see-through display;
a camera configured to capture an image of a worker;
a memory configured to store a program; and
a processor configured to execute the program so as to:
detect a worker position of the worker in a work space by using an area sensor;
detect an arm of the worker based on the captured image of the worker by the camera and determine a length of the arm of the worker by analyzing the captured image of the worker;
detect a robot position of a robot;
detect a robot posture of the robot;
calculate a movable area of a movable unit of the robot;
determine no-collision distances from the robot to a surrounding area in the work space based on the worker position, the robot position, and the calculated movable area of the movable unit of the robot;
adjust the no-collision distances by adding the determined length of the arm of the worker in consideration of a distance between the robot position and a tip of a finger of the worker when the worker stretches the arm toward the robot and generate adjusted no-collision distances;
calculate a position of the virtual wall surrounding the robot based on the adjusted no-collision distances;
display the virtual wall on the see-through display attached to the worker; and
change the position of the virtual wall displayed on the see-through display according to changes of the worker position.

18. The robot system according to claim 17, wherein the processor is configured to change a display form of the virtual wall based on a distance between the worker position and the virtual wall.

19. The robot system according to claim 18, wherein a type of the display form of the virtual wall changed based on a distance between the virtual wall and the movable unit is different from a type of the display form of the virtual wall changed based on the distance between the worker position and the virtual wall.

20. The robot system according to claim 17, wherein the processor is configured to calculate a distance between the virtual wall and a future position of the movable unit of the robot at which the movable unit is located after a period of time passes from a current time, and
the processor is configured to change a display form of the virtual wall at the current time based on the calculated distance between the virtual wall and the future position of the movable unit of the robot.

* * * * *